United States Patent
Ohta et al.

(10) Patent No.: US 7,770,462 B2
(45) Date of Patent: Aug. 10, 2010

(54) APPARATUS FOR MEASURING A MECHANICAL QUANTITY

(75) Inventors: Hiroyuki Ohta, Tsuchiura (JP); Takashi Sumigawa, Fukuoka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/184,104

(22) Filed: Jul. 31, 2008

(65) Prior Publication Data

US 2008/0289432 A1 Nov. 27, 2008

Related U.S. Application Data

(60) Division of application No. 11/797,417, filed on May 3, 2007, now Pat. No. 7,430,921, which is a continuation of application No. 11/217,299, filed on Sep. 2, 2005, now abandoned.

(30) Foreign Application Priority Data

Oct. 6, 2003 (JP) ............................. 2003-346481

(51) Int. Cl.
*G01B 7/06* (2006.01)
(52) U.S. Cl. ...................................... 73/777
(58) Field of Classification Search ............. None
See application file for complete search history.

(56) References Cited

U.S. PATENT DOCUMENTS

| | | | |
|---|---|---|---|
| 3,329,023 A * | 7/1967 | Kurtz et al. ............... 73/754 |
| 4,127,840 A | 11/1978 | House |
| 4,141,253 A | 2/1979 | Whitehead, Jr. |
| 4,777,826 A | 10/1988 | Rud et al. |
| 5,756,943 A | 5/1998 | Naito et al. |
| 6,422,088 B1 * | 7/2002 | Oba et al. .................. 73/754 |
| 6,915,702 B2 | 7/2005 | Omura et al. |
| 2001/0039837 A1 * | 11/2001 | Tanizawa et al. ............ 73/715 |
| 2002/0050172 A1 | 5/2002 | Toyoda et al. |
| 2004/0012253 A1 | 1/2004 | Stephane et al. |
| 2005/0229713 A1 | 10/2005 | Niblock |

FOREIGN PATENT DOCUMENTS

| | | |
|---|---|---|
| JP | 57-118677 A | 7/1982 |
| JP | 02-102581 A | 4/1990 |
| JP | 06-194275 A | 7/1994 |
| JP | 09-072805 A | 3/1997 |
| JP | 2000-079616 A | 3/2000 |
| JP | 2001-187611 | 7/2001 |
| JP | 2002-004798 A | 1/2002 |

* cited by examiner

*Primary Examiner*—Robert R Raevis
(74) *Attorney, Agent, or Firm*—Antonelli, Terry, Stout & Kraus, LLP.

(57) ABSTRACT

A mechanical quantity measuring apparatus is provided which can make highly precise measurements and is not easily affected by noise even when it is supplied an electricity through electromagnetic induction or microwaves. At least a strain sensor and an amplifier, an analog/digital converter, a rectification/detection/modulation-demodulation circuit, and a communication control circuit are formed in one and the same silicon substrate. Or, the silicon substrate is also formed at its surface with a dummy resistor which has its longitudinal direction set in a particular crystal orientation and which, together with the strain sensor, forms a Wheatstone bridge. With this arrangement, even when a current flowing through the sensor is reduced, measured data is prevented from being buried in noise, allowing the sensor to operate on a small power and to measure a mechanical quantity with high precision even when it is supplied electricity through electromagnetic induction or microwaves.

8 Claims, 23 Drawing Sheets

APPARATUS FOR MEASURING A MECHANICAL QUANTITY

CROSS-REFERENCE TO RELATED APPLICATION

This application is a Divisional application of application Ser. No. 11/797,417, filed May 3, 2007, now U.S. Pat. No. 7,430,921, which is a Continuation application of application Ser. No. 11/217,299, filed Sep. 2, 2005, now abandoned, the contents of which are incorporated herein by reference in their entirety.

BACKGROUND OF THE INVENTION

The present invention relates to an apparatus capable of measuring a mechanical quantity and outputting a measured value wirelessly.

What is generally called an RF tag has been developed which uses an electricity supplied through electromagnetic induction to active a circuit and thereby transmit a preset ID number wirelessly and which is beginning to be applied to a goods distribution management and a management of admission tickets. Attempts are currently under way to connect a physical quantity sensor to such an ID tag. For example, as disclosed in JP-A-2001-187611, a temperature sensor is connected to an RF tag circuit on a printed circuit board, and the temperature sensor mounted on the printed circuit board is then entirely molded with plastic to form an ID tag with a sensor.

BRIEF SUMMARY OF THE INVENTION

When a strain sensor and a mechanical quantity sensor applying the strain sensor, such as pressure sensor, vibration sensor and acceleration sensor, are connected to a circuit that uses an electricity supplied through electromagnetic induction or microwaves to transmit the result of measurement, however, the following problems characteristic of the mechanical quantity sensor arise.

First, the strain sensor has a very small output for a measured strain and is very vulnerable to noise as compared with other sensors such as temperature sensor. For example, in normal use, the strain gauge is required to have a resolving power of the order of $10^{-5}$ and a resistance variation ($\Delta R/R$) in the most commonly used resistor wire type strain gauge is about $2\times10^{-5}$. That is, the strain gauge is required to detect when the resistor, whose resistance is 1 in a no-strain condition, produces a resistance of 1.00002 when strained. At this time, if any noise, even at a small level, enters the circuit, it can cause large measuring errors. Particularly when the apparatus is operated on an electric power supplied through electromagnetic induction or microwaves, the strain sensor is also subjected to a radio wave, making it easier for the noise to enter the circuit. Further, when the electricity supplied by electromagnetic induction or microwaves is used, an amount of electricity that can be supplied to the strain sensor is very limited and is required to be set two or more orders of magnitude smaller than when a commonly marketed strain gauge and an amplifier are used. Thus, if the current flowing through the strain sensor is set at a level of the order of μA, the apparatus becomes susceptible to noise, rendering the measurements practically impossible without special considerations. The strain measurement is often made by directly attaching the sensor to an object being measured. Considering this condition of use, it is difficult to cover the sensor and its lead wires with a conductive material for perfect electromagnetic shield. It is therefore an object of this invention to provide a mechanical quantity measuring apparatus which is not susceptible to noise and can make highly precise measurements even when an electric power is supplied to the circuit through electromagnetic induction or microwaves.

A second problem is that the mechanical quantity sensor using a semiconductor has a larger temperature dependency of the measured value than other physical quantity sensors, so that unlike other sensors, the mechanical quantity sensor is required to perform a temperature correction. Normally, the strain sensor is combined with a dummy resistor having the same temperature dependency as the strain sensor to form a Wheatstone bridge circuit to perform the temperature correction. At this time, considerations must be taken to ensure that the dummy resistor and the sensor have the same temperatures. It is also necessary to keep the dummy circuit in the bridge circuit in a non-strained condition. For this purpose, the dummy resistor and the sensor need to be arranged separately and connected together. However, the lead wires for connection easily pick up noise, making the measurement practically impossible without special considerations as in the case with the first problem. It is therefore an object of this invention to provide a mechanical quantity measuring apparatus which is not susceptible to noise and influences of temperature and can make highly precise measurements even when an electric power is supplied to the circuit through electromagnetic induction or microwaves.

To make the apparatus resistant to influences of noise even when a power consumption by the apparatus is lowered, a strain sensor taking advantage of a piezoresistive effect and a circuit operating on an electricity supplied by electromagnetic induction or microwaves are formed in the same silicon substrate.

Further, to make the apparatus resistant to temperature influences and to influences of noise even when a power consumption by the apparatus is lowered, a Wheatstone bridge circuit is provided in the same single crystalline silicon substrate by forming an impurity diffusion layer whose longer side lies in a particular direction.

For example, the mechanical quantity measuring apparatus may have formed in one main surface of a single crystal semiconductor substrate a strain sensor, an amplifying conversion circuit to amplify a signal from the strain sensor and convert it into a digital signal, a transmission circuit to transmit the converted digital signal to the outside of the semiconductor substrate, and a power circuit to supply in the form of electricity an electromagnetic wave energy received from outside the semiconductor substrate.

Or the mechanical quantity measuring apparatus may have formed in one main surface of a single crystal semiconductor substrate a Wheatstone bridge circuit made up of a strain sensor and a dummy resistor, a conversion circuit to amplify a signal from the Wheatstone bridge circuit and convert it into a digital signal, a transmission circuit to transmit the digital signal to the outside of the semiconductor substrate, and a power circuit to supply in the form of electricity an electromagnetic wave energy received from outside the semiconductor substrate.

Or the mechanical quantity measuring apparatus may have formed in one main surface of a single crystal silicon substrate a Wheatstone bridge circuit made up of a strain sensor and a dummy resistor, a conversion circuit to amplify a signal from the Wheatstone bridge circuit and convert it into a digital signal, a transmission circuit to transmit the digital signal to the outside of the silicon substrate, a power circuit to supply electricity to these circuits according to a signal representing at least one of vibrations, sunlight and temperature difference received from outside the silicon substrate, and a connector to electrically connect power supply ground of one or more of the circuits in the single crystal silicon substrate to an object being measured.

This invention offers an advantage that, even when a mechanical quantity sensor is operated by using a small electricity supplied through electromagnetic induction or microwaves, noise picked up by the sensor can be made very small. Since all the circuits are formed in a small area on the same silicon substrate, a current that would otherwise be induced by a phase difference of radio waves when RF feeding (supply of electricity in the form of radio wave energy) is performed can be prevented from being generated in the sensor, making it possible for a sensor to perform its intended sensing operation even when a small electric power is used. That is, when activating the circuits by using an induced current as a power source, it is essential to reduce the power consumption of the sensor. In that case, data from the sensor is not buried in noise, allowing for correct measurement.

Further, since the Wheatstone bridge circuit of the above arrangement and construction is provided in the same single crystal silicon substrate, a small change in the resistance of the mechanical quantity sensor can be compensated for. Also, a good thermal conductivity of the silicon substrate assures an accurate temperature correction and thereby improves a measurement precision. Further, since a small strain sensor and a dummy resistor are formed in the same single crystal silicon substrate, noise does not easily enter the Wheatstone bridge circuit, preventing the measured data from being buried in noise even when the current flowing in the sensor is reduced. This in turn makes for a reduction in the power consumption of the sensor.

Furthermore, since the sensor's power consumption can be reduced, this invention enables the sensor to be operated with a small energy. This means that the sensor can operate on an electric power supplied through electromagnetic induction or microwaves and also on electricity locally generated by vibrations and solar cells.

Other objects, features and advantages of the present invention will become more apparent from the following description of embodiments of the invention when taken in conjunction with the accompanying drawings.

DETAILED DESCRIPTION OF THE INVENTION

Embodiments of this invention will be disclosed. A strain measuring system that operates on an electricity supplied by electromagnetic induction or microwaves can be formed on one and the same silicon substrate.

Figure 1:
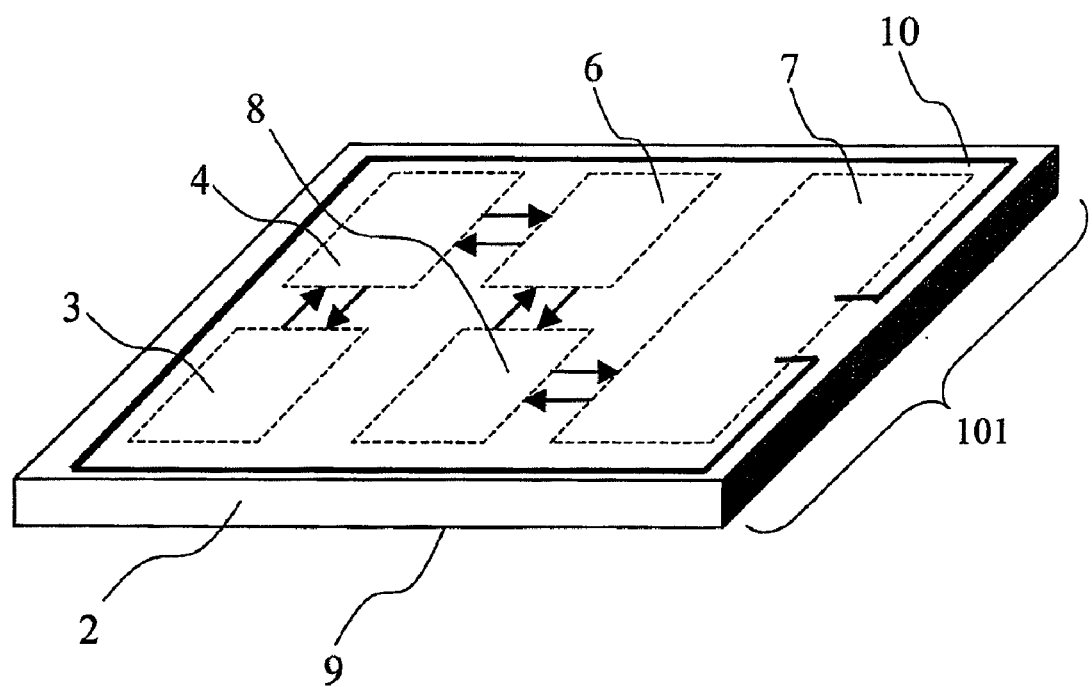
FIG. 1 is a perspective view of a mechanical quantity measuring apparatus as a first embodiment of this invention.

Embodiments of this invention will be described by referring to FIG. 1 through FIG. 10. FIG. 1 shows a mechanical quantity measuring apparatus 1 as a first embodiment of this invention. This embodiment is a mechanical quantity measuring apparatus having formed on one and the same single crystal silicon substrate 2 at least a strain sensor 3 utilizing a piezoresistive effect, a strain sensor amplifier group 4, an analog/digital converter 6, a rectification/detection/modulation-demodulation circuit 7, a communication control unit 8, a bonding surface 9, and an antenna 10. In the following description the silicon substrate 2 and a group of thin films formed on the silicon substrate 2 are together called a chip 101. Although the antenna 10 may be formed in large size outside the chip to receive a greater amount of electricity, the following description takes up a case where the antenna is incorporated in the chip 101. When the antenna 10 is incorporated in the chip 101, the mechanical quantity measuring apparatus 1 constitutes the chip 101; and when an external antenna is used, the combination of the chip 101 and the antenna 10 is called the mechanical quantity measuring apparatus 1. Incorporating the antenna in the chip 101 obviates the need for an electrode pad for external connection. This is desirable in terms of reliability because electrodes are not exposed on the chip surface, protecting the electrode pad against corrosion even when used under severe environments. In this embodiment, the chip 101 is bonded at the bonding portion to an object 11 to be measured so that a strain is transmitted to the silicon substrate 2. When the silicon substrate 2 as a whole is loaded with a strain, a resistance of the strain sensor 3 in the silicon substrate 2 changes and this resistance change is converted into a digital signal through the strain sensor amplifier group 4 and the analog/digital converter 6. The digital signal is then converted into a radio signal through the communication control unit 8 and the rectification/detection/modulation-demodulation circuit 7 and sent from the antenna 10 to a leader. A high-frequency signal for electric power transmitted from the leader is received by the antenna 10, smoothed by the rectification/detection/modulation-demodulation circuit 7 into a DC power of a constant voltage, which is then supplied as a power source to various circuits in the mechanical quantity measuring apparatus. While this embodiment realizes an energy transmission by using an electromagnetic induction that forms an induced electric field in the antenna or microwaves that are received and demodulated, it is possible to utilize a mutual induction of coils for energy transmission or use light for energy supply and communication.

The back of the silicon substrate is used as a bonding surface.

Figure 2:
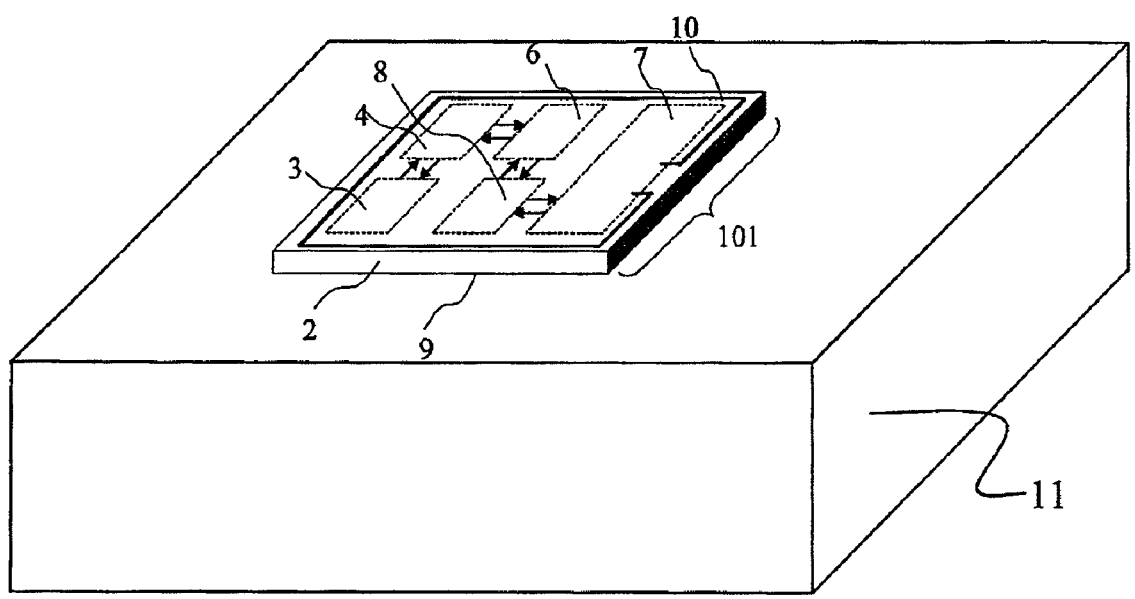
FIG. 2 is a perspective view showing how the mechanical quantity measuring apparatus as the first embodiment of the invention is used.
Figure 3:
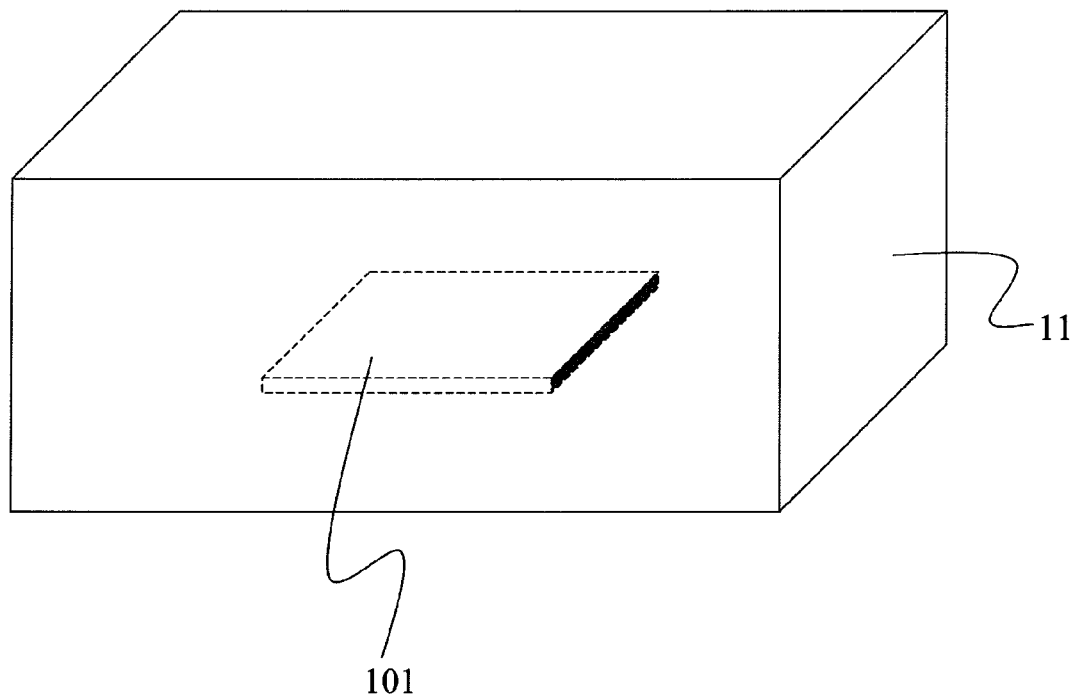
FIG. 3 is a perspective view showing how the mechanical quantity measuring apparatus as the first embodiment of the invention is used.

In the mechanical quantity measuring apparatus 1, a bonding surface 9 is formed at the back of the silicon substrate opposite the device forming surface. As shown in FIG. 2, the mechanical quantity measuring apparatus 1 is attached at its bonding surface 9 to the object 11 being measured in order to measure a strain. In the mechanical quantity measuring apparatus 1, a strain can be measured by applying the strain through the bonding surface 9 to the entire silicon substrate in which various circuits are formed. Since the strain sensor 3 and its processing circuits are highly integrated in the same silicon substrate, they can be formed compact. It is preferred that the thickness of the silicon substrate be set less than or equal to 100 μm. In that case a strain value at the position of the strain sensor 3 can be made to match a strain value of the object 11. That is, keeping the thickness of the silicon substrate 2 less than or equal to 100 μm can improve the measuring accuracy. Forming the silicon substrate 2 in the thickness of less than or equal to 100 μm offers another advantage that when the object 11 being measured has a curved surface, the strain sensor 3 can be bonded to the curved surface without being broken. Further, since the silicon substrate 2 has a higher heat conductivity than an insulation film, the arrangement of the bonding surface 9 at the back of the silicon substrate 2 allows the heat of the object 11 to be transmitted easily to the strain sensor 3 on the front surface of the silicon substrate 2, offering an advantage of preventing an accuracy degradation that would otherwise result from object temperature detection variations when a temperature correction is performed. Further, as the object temperature increases, with the sensor attached to the object 11, large heat stresses may develop between the chip 101 and the object 11. In this invention, the silicon substrate 2 has the bonding surface 9 at the back and the back surface of the silicon substrate has a greater bonding strength and fracture strength than the chip surface formed of, for example, glass. Therefore, when the temperature of the object 11 increases, the silicon substrate does not break or peel off at the bonding surface 9, assuring a reliable measurement. The bonding surface 9 is formed by roughening the back surface of the silicon substrate and its roughness is set to more than 1 micron, which is larger than the roughness of the chip surface. This roughened surface produces an anchoring effect that improves the performance of bonding to the object 11. As shown in FIG. 3 the chip 101 may be embedded in the object 11 to measure mechanical quantities. While this embodiment uses a silicon substrate, other semiconductor substrates may also be used whose surface is formed of single crystal.

Further, in this embodiment since the strain sensor 3, the strain sensor amplifier group 4 and the analog/digital converter 6 are formed in the same silicon substrate and these circuits are interconnected in the chip, wires connecting the strain sensor 3 and other circuits can be made very short, making noise entering the circuit extremely small even when the apparatus is operated by using the electricity supplied through the electromagnetic induction or microwaves. When an induced current is used as a power supply to operate the circuits, it is essential to reduce the power consumption of the sensor. In this case also, this embodiment can prevent sensor data from being buried in noise, assuring a correct measurement.

When only the strain sensor is attached to the object being measured, with other circuits formed separate from the sensor to avoid possible influences of strain, however, the lead wire easily picks up noise when radio waves from electromagnetic induction or microwaves are received. Thus the measure data is buried in noise, rendering the measurement practically impossible without special considerations. This is caused by the fact that since the sensor and other circuits are situated at separate locations, a phase difference occurs between the sensor and the other circuits during the radio wave application, producing a signal of a potential different from the original. In this embodiment, on the other hand, since a portion involved in the strain measurement can be deemed almost as a point when compared with an expanse of the radio waves, no phase difference is produced, making noise entering the circuits very small, thus allowing for a correct measurement.

Next, the arrangement of the amplifier and the sensor will be explained.

Figure 4:
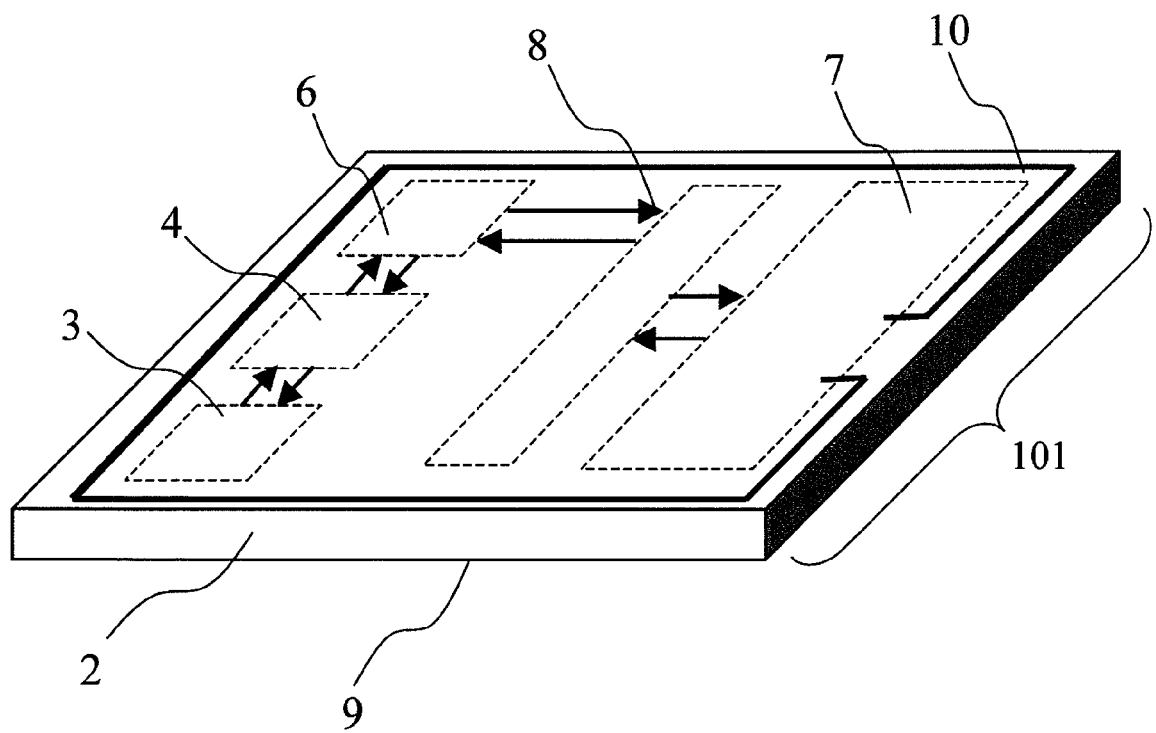
FIG. 4 is a perspective view of the mechanical quantity measuring apparatus as the first embodiment of the invention.

In this embodiment, as shown in FIG. 4, the strain sensor 3 and the strain sensor amplifier group 4 are formed adjacent to each other, and the strain sensor amplifier group 4 and the analog/digital converter 6 are formed adjacent to each other. Since the strain sensor 3 and the strain sensor amplifier group 4 are arranged more close to each other and the strain sensor amplifier group 4 and the analog/digital converter 6 are also arranged more close to each other than to the rectification/detection/modulation-demodulation circuit 7 and to the communication control unit 8, there is an advantage of the wires being short and noise not easily being picked up during radio wave application. Further, since this arrangement makes the strain sensor 3, strain sensor amplifier group 4, analog/digital converter 6 and temperature sensor unit 12 quickly become uniform in temperature, there is an advantage that the apparatus is not easily affected by temperature drifts.

Figure 5:
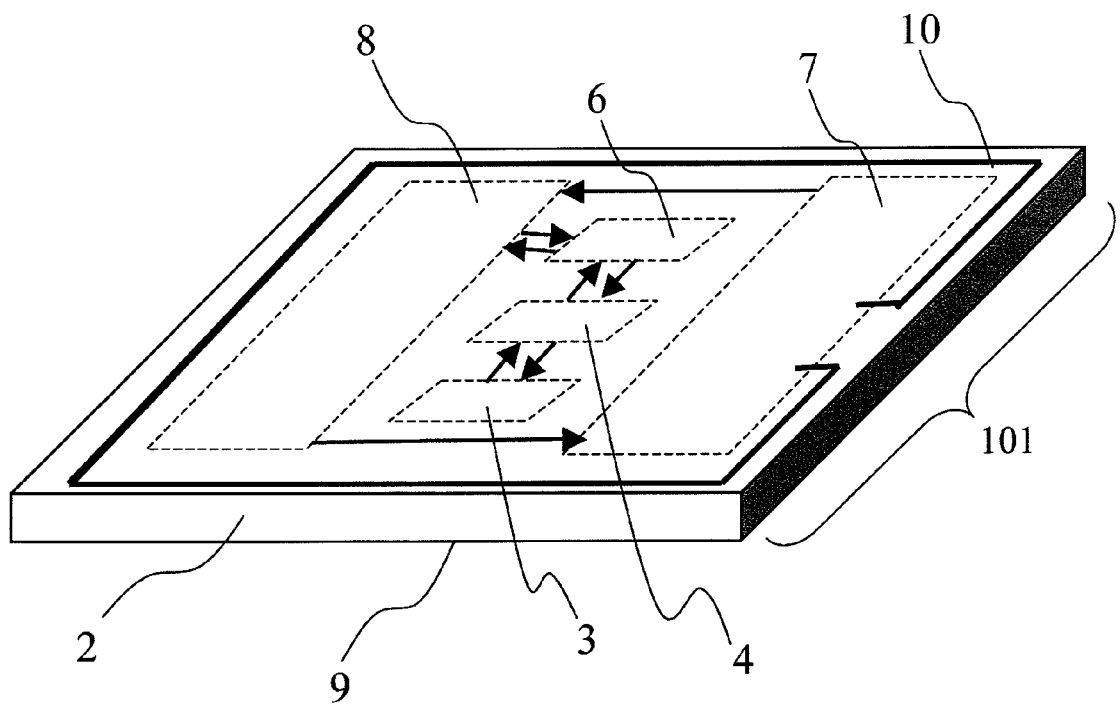
FIG. 5 is a perspective view of the mechanical quantity measuring apparatus as the first embodiment of the invention.

Further, if the strain sensor is arranged at an end portion of the chip 101, a stress in the surface of the chip 101 may become ununiform. Particularly at the end portion of the chip, measured values may be largely different from the actual strain of the object, so it is desired that the strain sensor be put closer to the central portion of the chip than the rectification/detection/modulation-demodulation circuit 7, the communication control unit 8 and the antenna 10. That is, as shown in FIG. 5, a distance from the strain sensor 3 to a rotationally symmetric axis or the center of the chip is preferably shorter than that from the rectification/detection/modulation-demodulation circuit 7, the communication control unit 8 and antenna 10 to the rotationally symmetric axis or the center of the chip.

Figure 6:
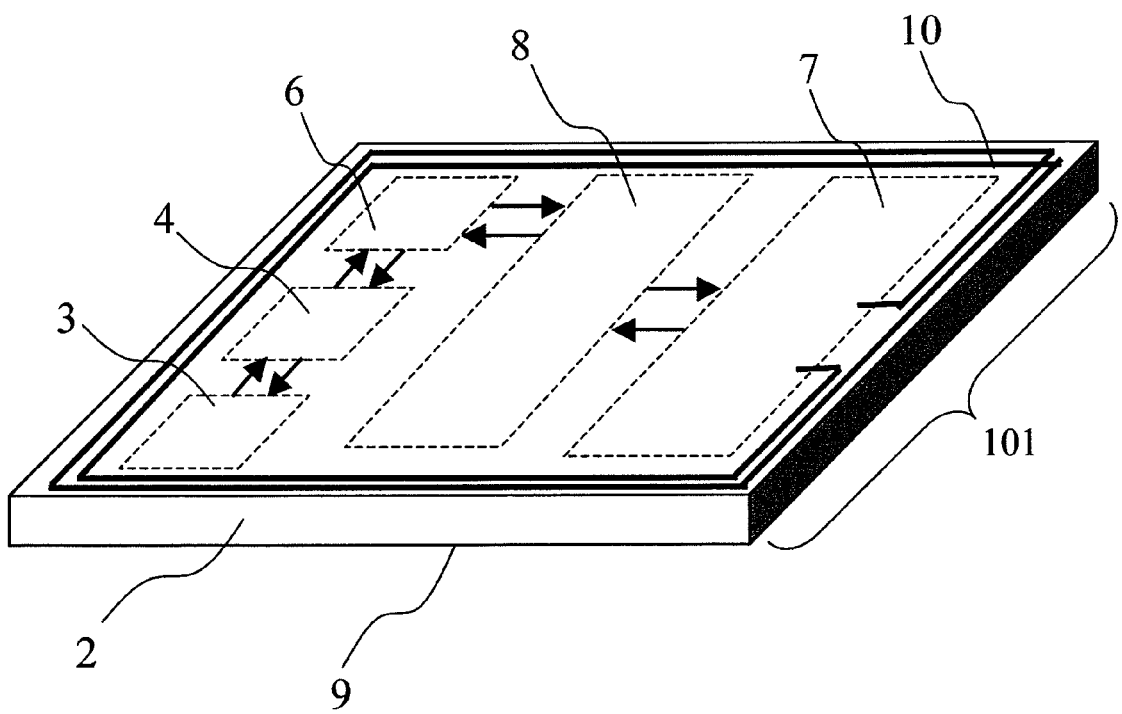
FIG. 6 is a perspective view of the mechanical quantity measuring apparatus as the first embodiment of the invention.

Particularly, since the antenna 10 is a relatively large structure in the chip, it may cause a strain nonuniformity in a plane. Thus, as shown in FIG. 1 and FIGS. 4 to 6, the antenna 10 is preferably arranged along the periphery of the chip 101 with the strain sensor placed inside the antenna. This also applies when a coil of the antenna 10 is wound several times, as shown in FIG. 6. Further, when the antenna 10 is an external antenna and formed of a film outside the silicon chip, the above arrangement produces the similar effect.

The sensor is arranged so that its longitudinal direction matches the longitudinal direction of other devices.

Figure 7:
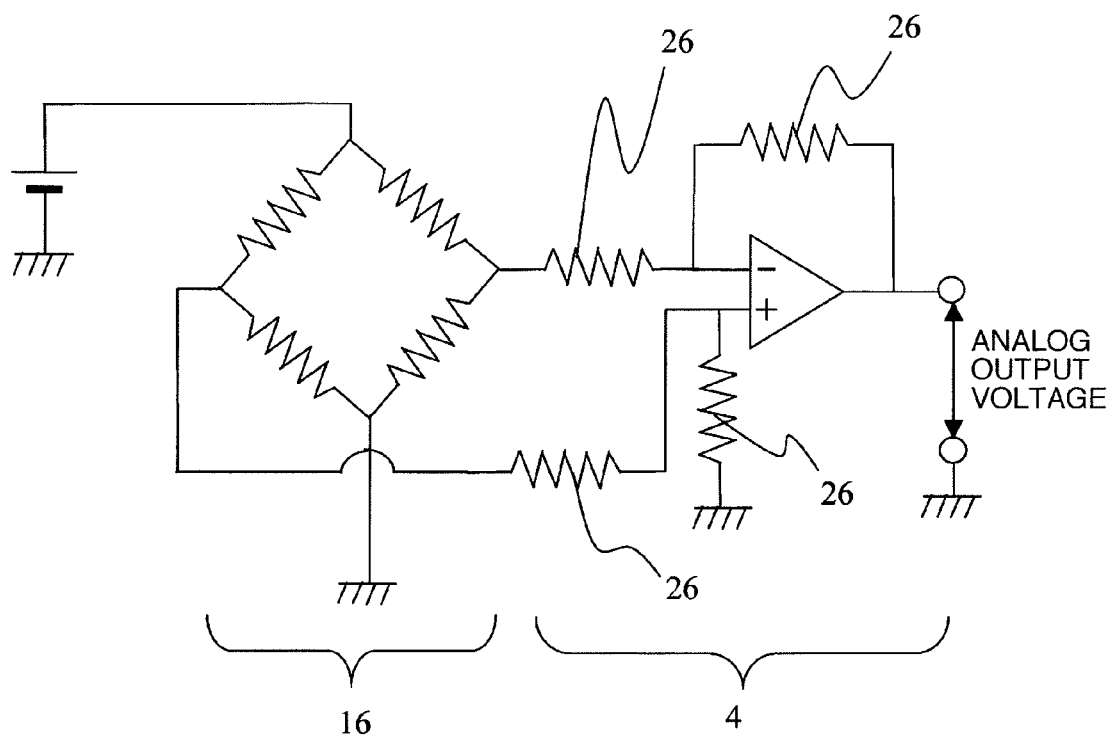
FIG. 7 is a perspective view of the mechanical quantity measuring apparatus as the first embodiment of the invention.
Figure 8:
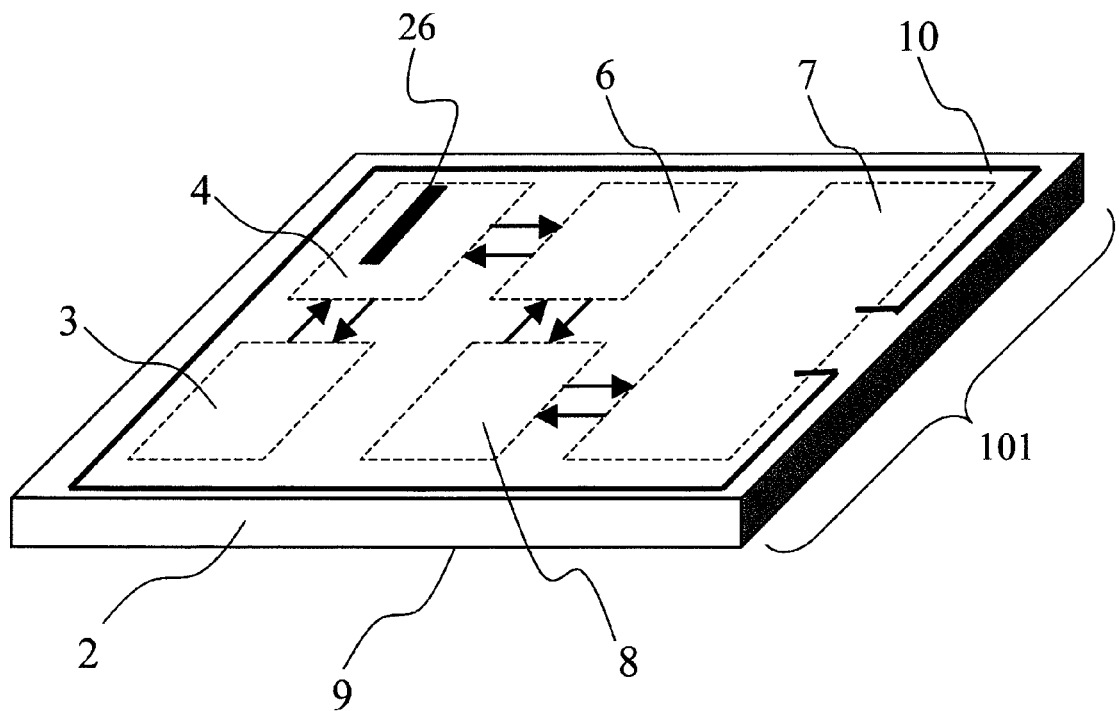
FIG. 8 is a perspective view of the mechanical quantity measuring apparatus as the first embodiment of the invention.

Further, in this embodiment, the longitudinal direction of resistors 26 used in a feedback circuit of the strain sensor amplifier group 4 shown in FIG. 7 is preferably arranged as close to the strain measuring direction as possible, as shown in FIG. 8. For example, if the longitudinal direction of the resistors 26 is set perpendicular to the strain measuring direction and when even a small force is applied in the direction perpendicular to the strain measuring direction, the amplification factor changes greatly, producing large measuring errors. On the other hand, if the longitudinal direction of the resistors 26 is set parallel to the strain measuring direction, a sensitivity becomes small in a direction perpendicular to the strain measuring direction. It is noted, however, that since there is a sensitivity in the longitudinal direction of the resistors 26, the amplification factor slightly varies depending on the strain. This can be corrected by applying a known strain and using the corresponding measured value of the mechanical quantity measuring apparatus 1, thus assuring a highly accurate measurement. The similar effect can also be produced in a case where the chip includes only the strain sensor amplifier group 4 and the strain sensor 3, with the rectification/detection/modulation-demodulation circuit 7 and the communication control unit 8 removed. When the amplifier feedback resistors are formed of a diffusion resistor in the silicon substrate or when CMOS circuits and bipolar amplifiers are formed, the longitudinal direction of their current paths is set almost in <100> to make them less vulnerable to the influences of strains, thus assuring highly accurate measurement. According to the usage of this apparatus, this embodiment positively applies large strains to the apparatus. Thus, by lowering the strain sensitivity in other than the strain sensor, a highly precise measurement can be made.

It is preferred that the chip and the object being measured be set at the same potential.

It is also desired that the object 11 be electrically connected, either through DC or AC component, to the power supply ground of the chip 101. That is, the power supply ground of the chip 101 and the object 11 may be electrically connected or they may be electrically coupled by an AC component through a thin insulating film. As a result, the object 11 and the chip 101 have the same potential, so that the energy transmission efficiency can be improved when an electromagnetic energy is used as a power source or when radio waves are transmitted.

The strain measuring direction is preferably marked on the chip.

Figure 9:
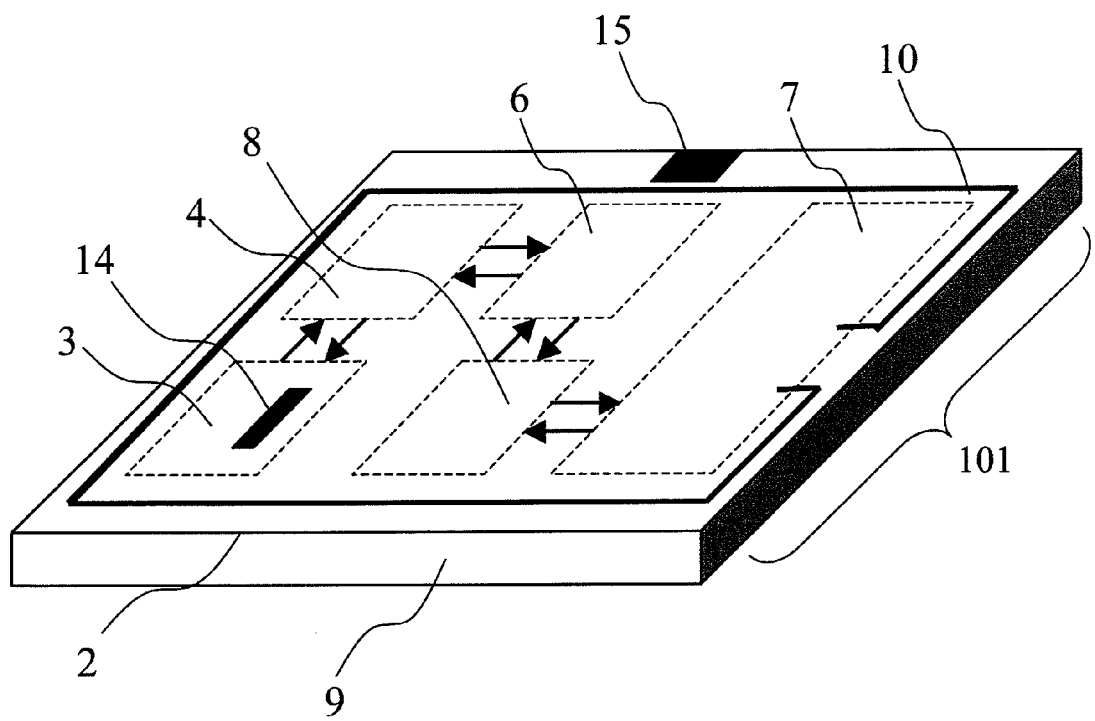
FIG. 9 is a perspective view of the mechanical quantity measuring apparatus as the first embodiment of the invention.

This embodiment is characterized in that the strain measuring direction is marked on the chip, as shown in FIG. 9. The strain sensor in the chip is often as small as several tens of microns in size and the strain sensor, and the other circuits are formed in the same silicon substrate. Thus, the direction of the gauge cannot be seen as in the conventional strain gauges. It is therefore necessary to attach a mark 15 representing the strain measuring direction according to the direction of the diffusion layer 14 in the silicon substrate surface that senses a strain.

Figure 10:
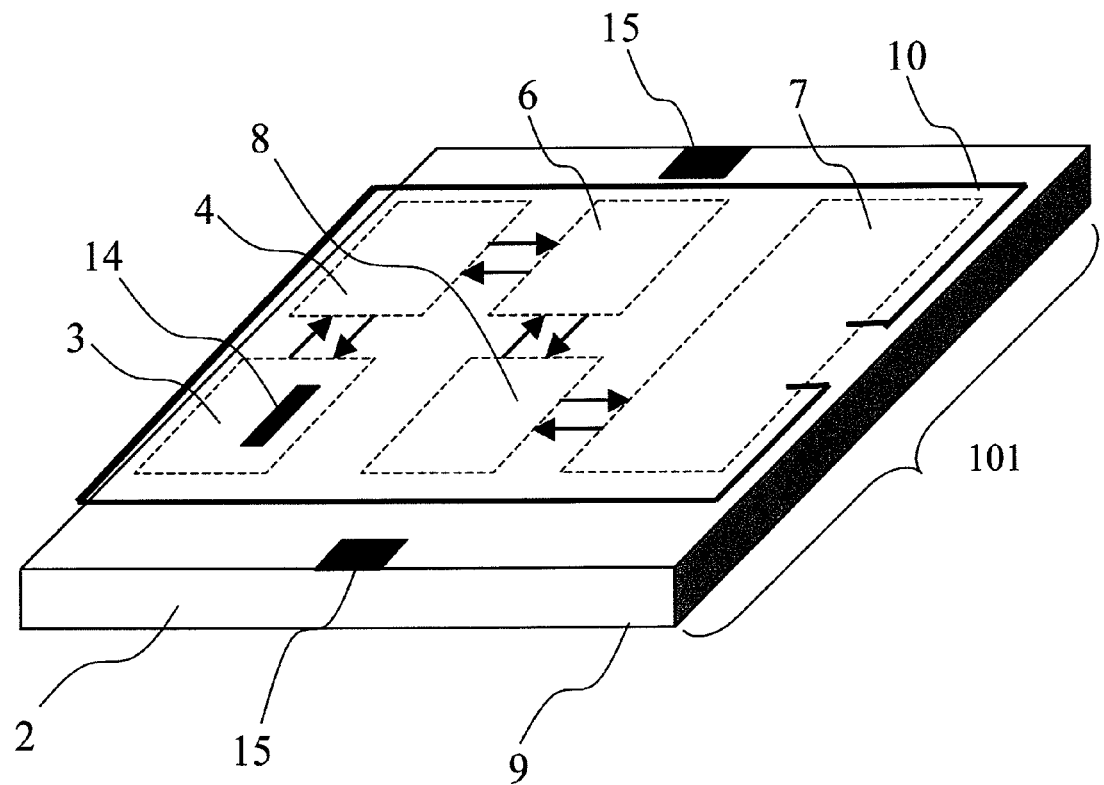
FIG. 10 is a perspective view of the mechanical quantity measuring apparatus as the first embodiment of the invention.

Since the longitudinal direction of the diffusion layer 14 in the silicon substrate surface that senses a strain is the strain measuring direction, the chip is marked at 15 for the user to be able to recognize that direction. This mark 15 is preferably made in the form of a thin film formed near the surface of the chip 101 or in the form of a scar on the silicon chip. This mark 15 may be used in combination with the function of the antenna 10 and need only be a thin film large enough to be recognized by the user. Further, as shown in FIG. 10, the mark 15 may be provided at two locations, front and rear.

A second embodiment of this invention will be explained by referring to FIG. 11 through FIG. 39. Although the mechanical quantity measuring apparatus of this embodiment has basically the same construction and feature as the first embodiment, it is characterized in that a Wheatstone bridge 16 made up of strain sensors 3 and dummy resistors 17 is formed in the same single crystal silicon substrate that incorporates other circuits. Although the dummy resistors 17 may also have a small strain sensitivity, they are called dummy resistors 17 for the sake of explanation.

Figure 11:
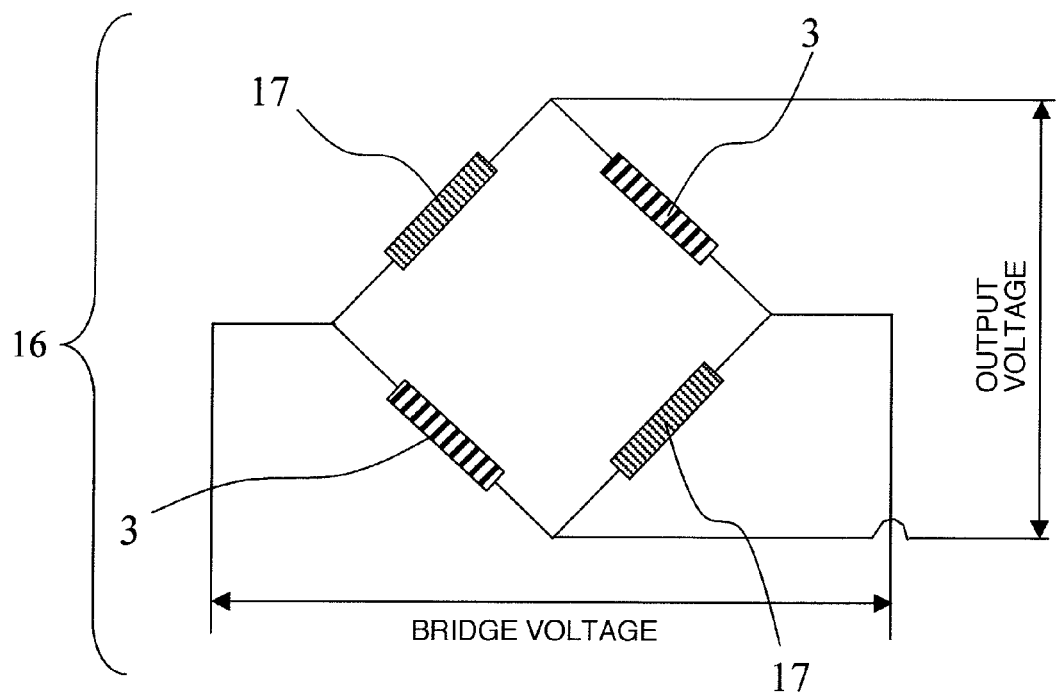
FIG. 11 is an explanatory diagram showing a Wheatstone bridge.

A circuitry of the Wheatstone bridge is shown in FIG. 11. Since the strain sensor 3 has a very small change in resistance caused by strain, simply amplifying the strain as is will make the signal processing at later stages complex. Thus, as in normal use of a strain gauge, it is often a common practice to form a Wheatstone bridge circuit 16 to produce an output voltage proportional to a change in the resistance of the strain sensor 3 and then to amplify the output voltage and use it as a value proportional to the strain. If a temperature dependence of the resistance of the dummy resistor 17 is set equal to that of the strain sensor 3, their temperatures can be made equal, thereby enabling the temperature correction of the strain sensor 3. At this time, the dummy resistors 17 in the Wheatstone bridge 16 must not be attached to the object in order to keep them in a no-strain state. The dummy resistor 17 has a smaller resistance change than the strain sensor 3 when subjected to strain.

However, when it is attempted to form the Wheatstone bridge 16 in the mechanical quantity measuring apparatus, a grave problem arises. Since the mechanical quantity measuring apparatus has various circuits formed in the same single crystal silicon substrate 2 and is bonded to the object through the bonding surface 9 at the back of the silicon substrate, other circuits than the strain sensor 3 are also affected by the strain. This means that forming the Wheatstone bridge 16 on the same silicon surface causes almost the same resistance change in the dummy resistor 17 as the strain sensor 3, making the correct measurement impossible.

Figure 12:
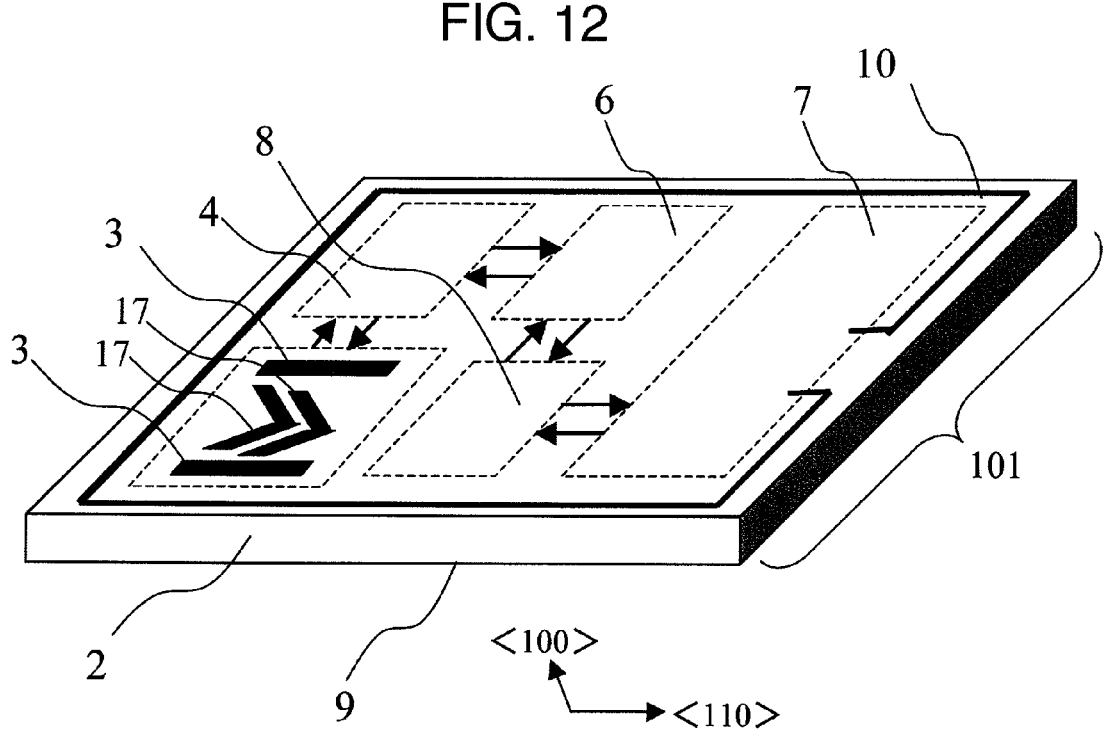
FIG. 12 is a perspective view of a mechanical quantity measuring apparatus as a second embodiment of the invention.

FIG. 12 shows a mechanical quantity measuring apparatus having the Wheatstone bridge 16 of this embodiment that can avoid the above problem. In the Wheatstone bridge 16, the strain sensor 3 is formed by locally diffusing a p-type impurity layer into the silicon substrate 2 and has its longitudinal direction in <110>. The dummy resistor 17 is similarly formed by locally diffusing a p-type impurity layer into the silicon substrate. The dummy resistor 17 is V-shaped as shown in FIG. 12 and is arranged so that longitudinal straight line segments of the V-shaped dummy resistor 17 extend in <100> direction. Further, the strain sensor 3 and the dummy resistor 17 are formed in a way that makes their resistances almost equal. The dummy resistor 17 is bent such that the two straight line segments of the V shape are equal in length.

Figure 13:
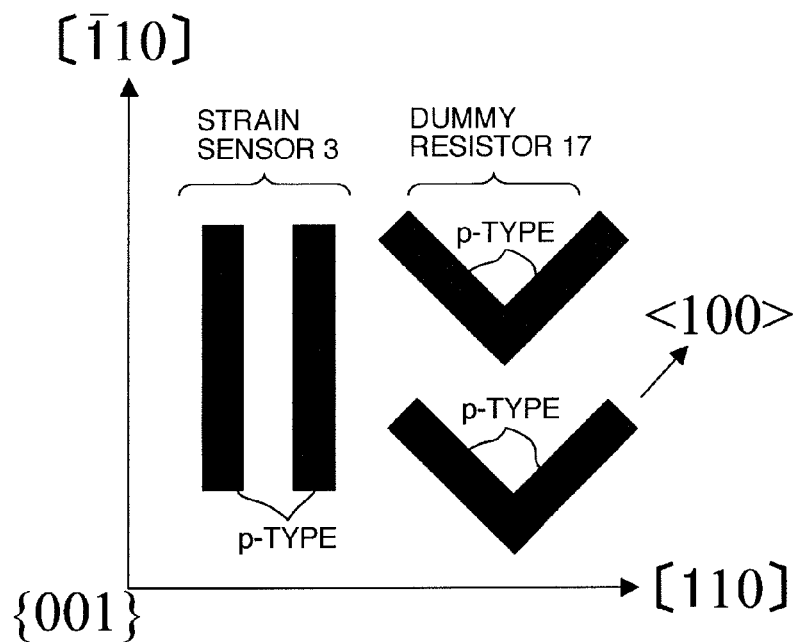
FIG. 13 illustrates a relation among a strain measuring direction, a crystal orientation of a silicon substrate, and a longitudinal direction of a diffusion layer in the mechanical quantity measuring apparatus as the second embodiment of the invention.
Figure 14:
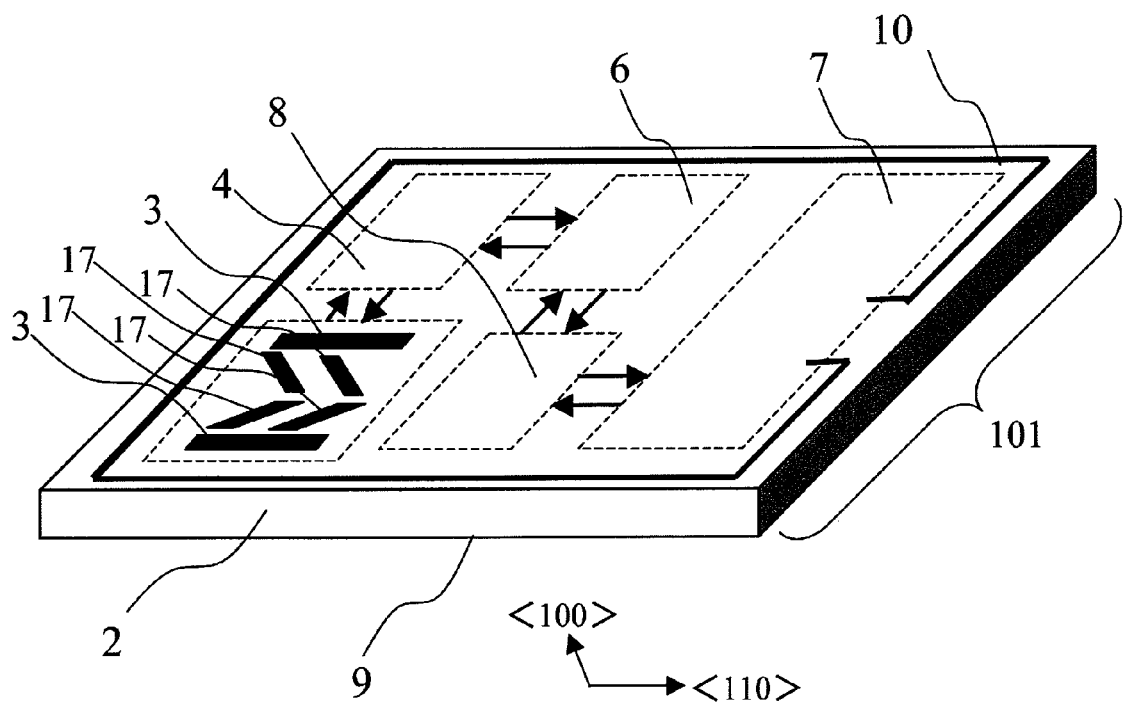
FIG. 14 is a perspective view of the mechanical quantity measuring apparatus as the second embodiment of the invention.
Figure 15:
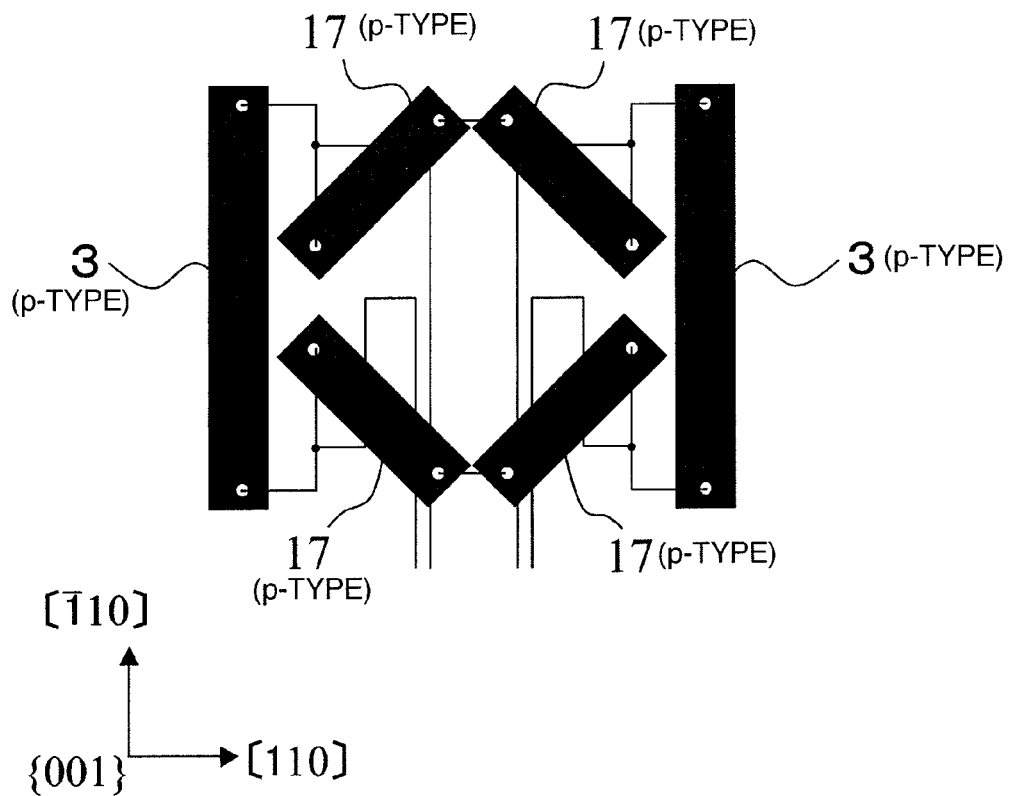
FIG. 15 illustrates a relation among a strain measuring direction, a crystal orientation of the silicon substrate, and a longitudinal direction of the diffusion layer in the mechanical quantity measuring apparatus as the second embodiment of the invention.

FIG. 13 shows a relation between the shapes of the strain sensor 3 and the dummy resistor 17 and a crystal orientation of the silicon substrate 2. Constructing the strain sensor 3 of the p-type impurity diffusion layer and arranging its longitudinal direction in <110> direction offers the advantage of increasing the strain sensitivities in the longitudinal direction and a direction perpendicular to it. That is, it is possible to measure the strains in these directions with higher priority. Here, the longitudinal direction may be interpreted as the direction in which an electric current flows. It is also possible to fold the impurity diffusion layer to form the strain sensor 3 and the dummy resistor 17. In that case, too, the longitudinal direction can be considered to be a direction in which the current flows in the diffusion layer. While <110> is taken to be the longitudinal direction, it may slightly deviate from the longitudinal direction to produce the similar effect but with an increased error. Further, by forming the dummy resistor 17 of the p-type impurity diffusion layer and setting the longitudinal direction in <100> direction, the sensitivity for a vertical strain can be minimized. And forming the dummy resistor 17 in the V shape can cancel the sensitivity for an in-plane shearing strain, further lowering the sensitivity of the dummy resistor 17. Further, since both of the strain sensor 3 and the dummy resistor can be constructed of the same p-type impurity layer, they can be formed simultaneously in the same process and thereby given almost equal resistances. For example, performing the ion implantation of the p-type impurity for both of them at the same time to form their impurity layers results in the strain sensor 3 and the dummy resistor 17 having almost equal sheet resistances. As a result, an offset of an output from the Wheatstone bridge circuit can be minimized without considering variations in manufacturing process. In that case, the impurity diffusion processing is preferably performed during an ion implantation process and a subsequent activation process because the accuracy of impurity dose is high and a diffusion profile has good reproducibility. Further, since the strain sensor and the dummy resistor can be made to have the same sheet resistances by forming them of the same p-type impurity layer at one time, their temperature dependencies of resistance can be made almost equal. If a design is made in which the impurity concentrations in the strain sensor and the dummy resistor are not equal, the similar effects to those described above can also be produced although there is some possibility of small errors occurring in the temperature correction and resistance deviations of the strain sensor 3 and the dummy resistor 17 are expected to vary. Rather than constructing the dummy resistor 17 of V-shaped diffusion layer, it is possible to connect together, through wires, diffusion layers whose longitudinal direction lies in <100> direction as shown in FIG. 14, in order to produce the same resultant effect. In that case, it is desired that the resistance value of the connected diffusion layers of the dummy resistor 17 be equal to that of the strain sensor 3. This arrangement offers an advantage that the layout of the strain sensor and the dummy resistor can be made freely. FIG. 15 shows an arrangement of diffusion layers and connections of bridge wires 18 when the construction of the diffusion layers of FIG. 14 is employed. The example shown in FIG. 15 considers the arrangement of the diffusion layers and the bridge wires 18 so that the lengths of bridge wires are equal as practically as possible. The diffusion layers may be arranged such that, as shown in FIG. 12 and FIG. 14, the V-shaped dummy resistors 17 may open in the same direction. This arrangement has the advantage of being able to reduce an area occupied by the Wheatstone bridge circuit 16. While in FIG. 12, FIG. 14 and FIG. 15 the two strain sensors 3 are arranged spaced apart with a group of dummy resistors 17 in between, they may be arranged parallel. This arrangement also can reduce the occupied area. Arranging the bride wires so as not to collapse a mirror symmetry like that of the bridge wires 18 of FIG. 15 can keep the bridge wires 18 from differing in length from one another greatly, thereby reducing resistance deviations of the four bridges.

Figure 16:
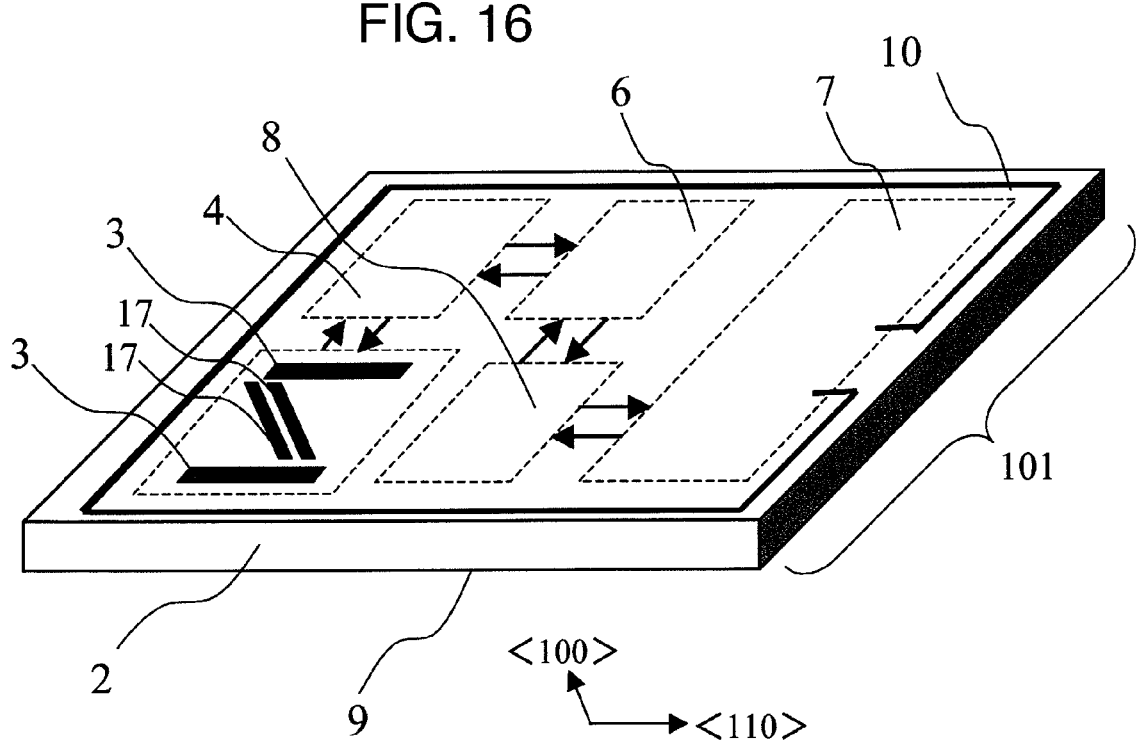
FIG. 16 is a perspective view of the mechanical quantity measuring apparatus as the second embodiment of the invention.
Figure 17:
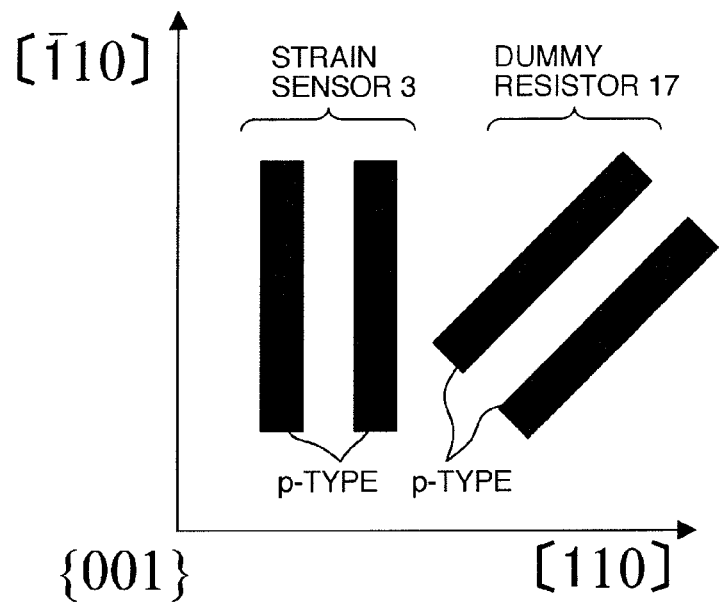
FIG. 17 illustrates a relation among a strain measuring direction, a crystal orientation of the silicon substrate, and a longitudinal direction of the diffusion layer in the mechanical quantity measuring apparatus as the second embodiment of the invention.
Figure 18:
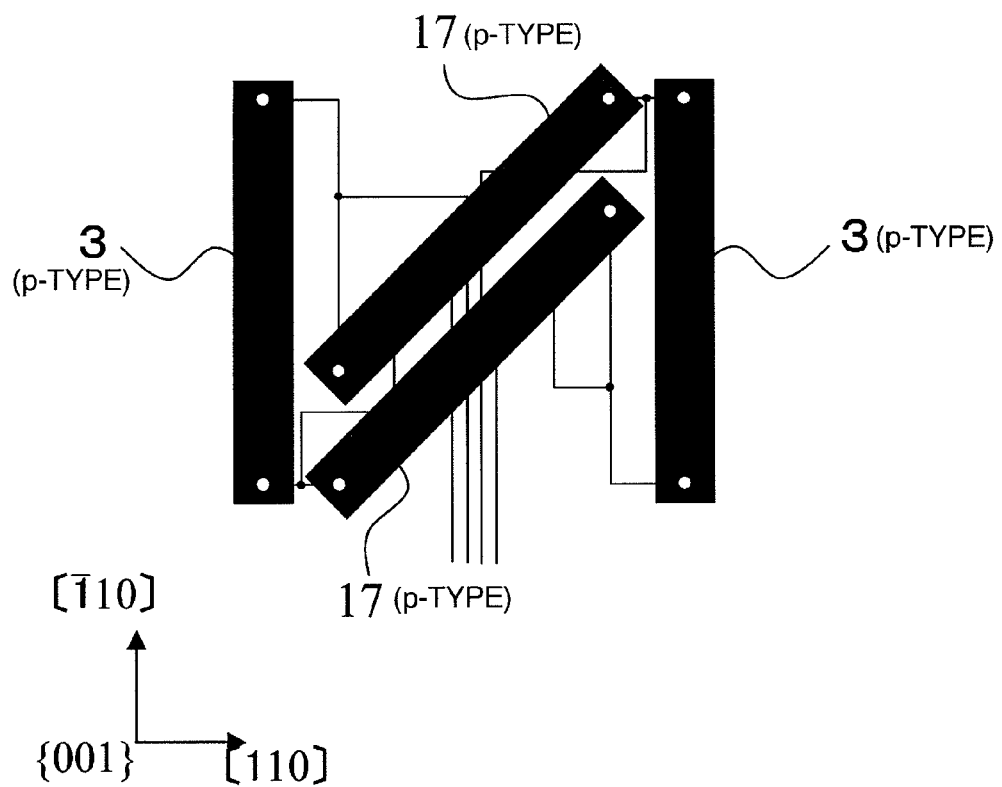
FIG. 18 illustrates one example of arrangement of the diffusion layers and interconnects connecting the diffusion layers in the mechanical quantity measuring apparatus as the second embodiment of the invention.

Further, when the dummy resistors are arranged linearly as shown in FIG. 16, not in the V-shaped configuration, the similar effects as described above can also be produced although they become slightly more susceptible to the influences of in-plane shearing force. FIG. 17 shows a relation between the shapes of the strain sensor 3 and the dummy resistor 17 and the crystal orientation of the silicon substrate 2. Forming the strain sensor 3 of a p-type impurity diffusion layer and setting a <110> direction as the longitudinal direction has the advantage of increasing the strain sensitivity in the longitudinal direction and in a direction perpendicular to it. The sensitivity for the vertical strain can be minimized by forming the dummy resistor of a p-type impurity diffusion layer and setting the longitudinal direction in <100> direction.

Although this method cannot cancel the in-plane shearing components, it has the advantage of simplifying the layout because the dummy resistor 7 is not arranged in a V-shaped configuration. Forming the dummy resistor 7 in the V-shaped configuration and matching the resistance value to that of the strain sensor 3 with high precision is difficult to achieve. In this respect, the method shown in FIG. 17 is simple and can match the resistance value of the dummy resistor 7 to that of the strain sensor 3 with high precision. An example of FIG. 18 considers the diffusion layers and the bridge wires 18 in a way that can make the bridge wires 18 as equal in length as possible.

While in the above explanation the strain sensor has been described to be formed in <110> direction and the dummy resistor in <100> direction, it should be noted that this is an ideal state and that the above-described effect can be produced even if there are some deviations in angle. That is, the above-described effect can be obtained by orienting the strain sensor in a direction closer to <110> than <100> and the dummy resistor in a direction closer to <100> than <110>.

Figure 19:
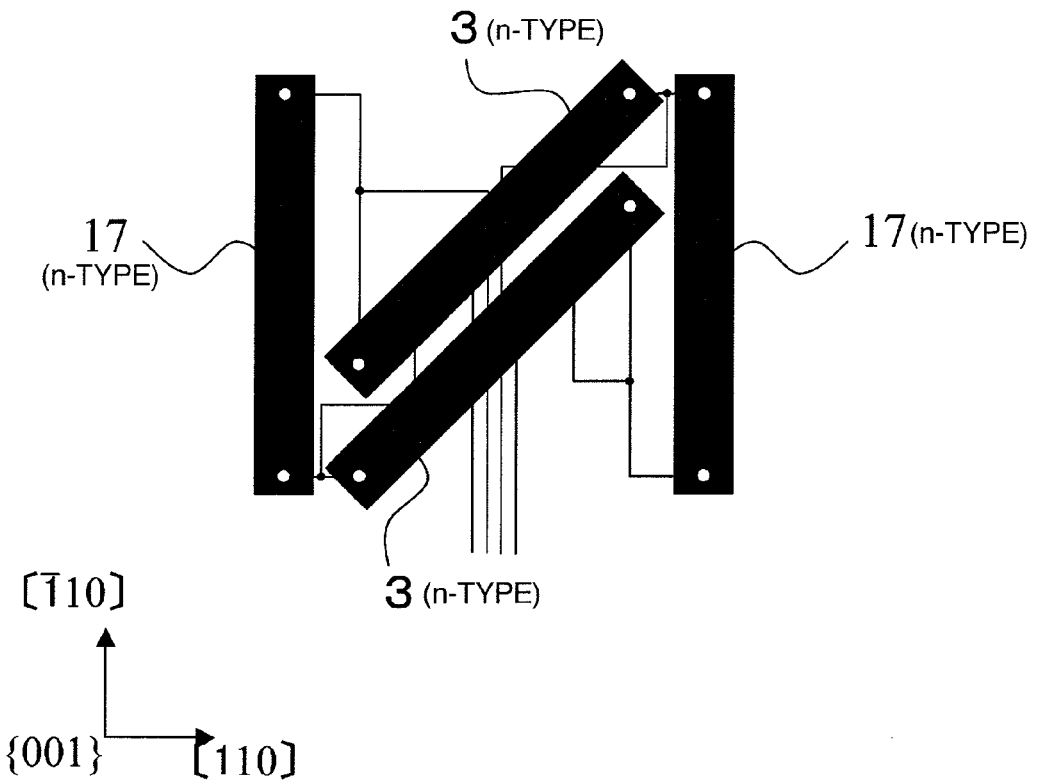
FIG. 19 illustrates another example of arrangement of the diffusion layers and interconnects connecting the diffusions layer in the mechanical quantity measuring apparatus as the second embodiment of the invention.
Figure 20:
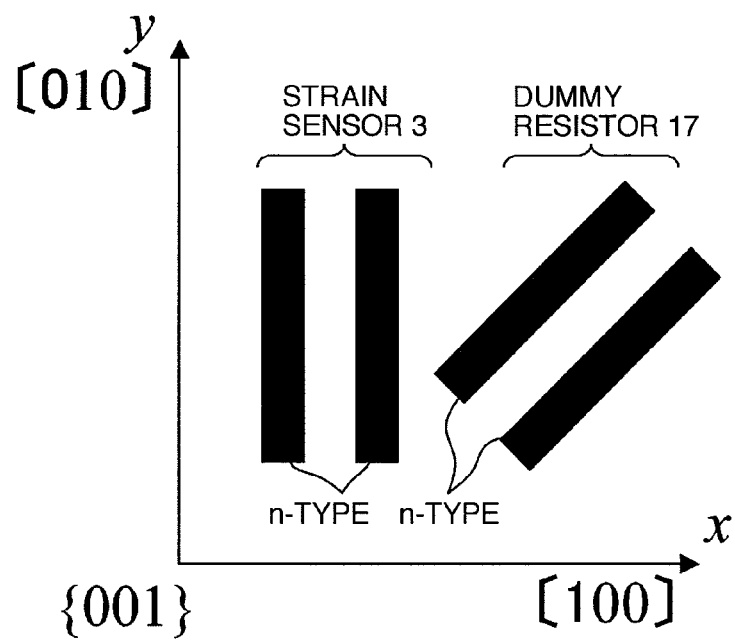
FIG. 20 illustrates a relation among a strain measuring direction, a crystal orientation of the silicon substrate, and a longitudinal direction of the diffusion layer in the mechanical quantity measuring apparatus as the second embodiment of the invention.
Figure 21:
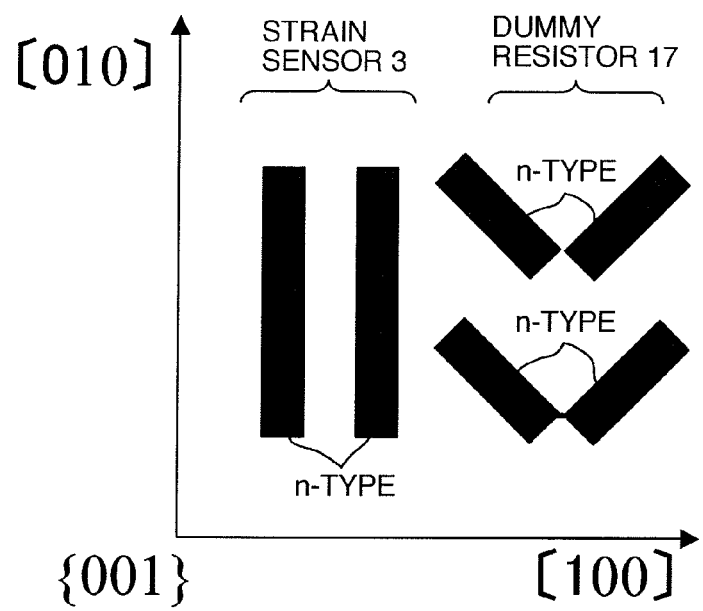
FIG. 21 illustrates a relation among a strain measuring direction, a crystal orientation of the silicon substrate, and a longitudinal direction of the diffusion layer in the mechanical quantity measuring apparatus as the second embodiment of the invention.
Figure 22:
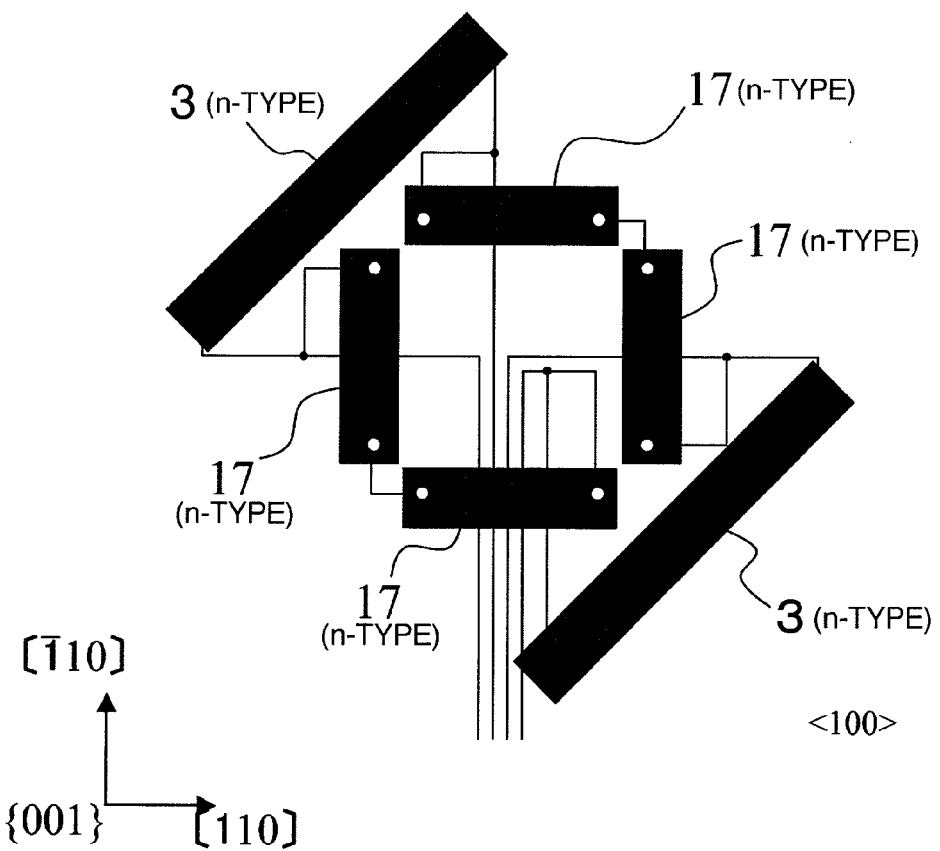
FIG. 22 illustrates another example of arrangement of the diffusion layers and interconnects connecting the diffusions layer in the mechanical quantity measuring apparatus as the second embodiment of the invention.
Figure 23:
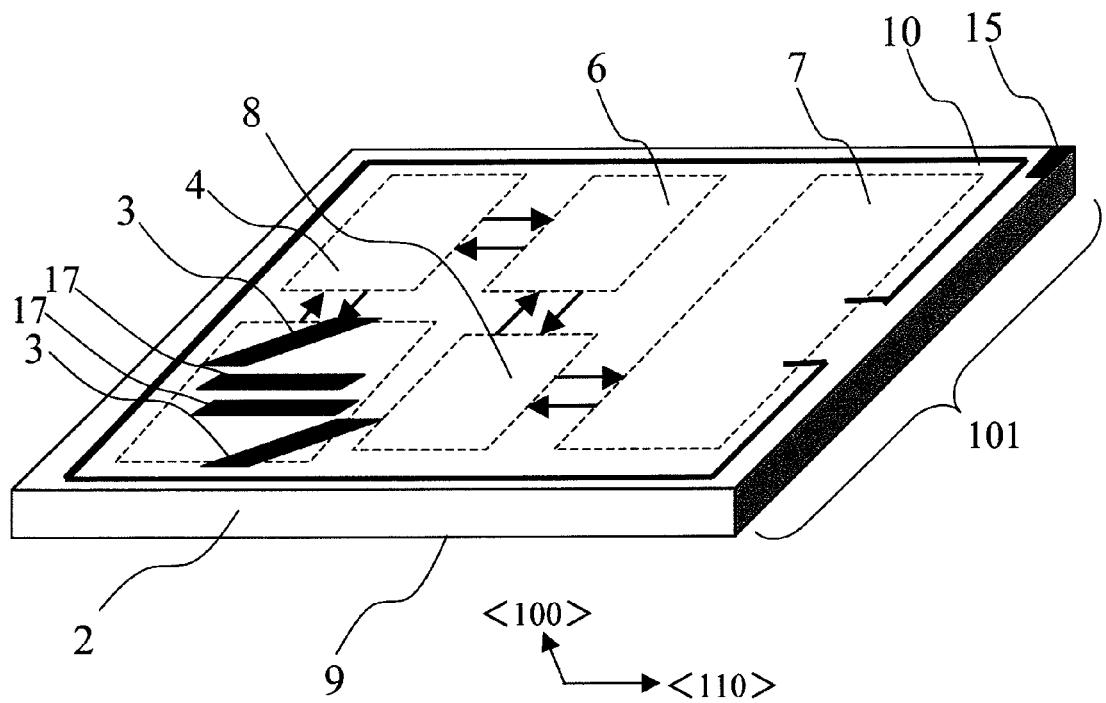
FIG. 23 is a perspective view of the mechanical quantity measuring apparatus as the second embodiment of the invention.

FIG. 19 shows an example arrangement when the silicon substrate 2 and the dummy resistor 17 are formed of an n-type impurity diffusion layer. FIG. 20 shows a relation between the shapes of the strain sensor 3 and dummy resistor 17 and the crystal orientation of the silicon substrate 2. In this case, the strain sensor 3 and the dummy resistor 17 are formed so that the longitudinal direction of the strain sensor 3 lies in <100> and that of the dummy resistor 17 lies in <110>. When a V-shaped dummy resistor 17 is used to cancel the in-plane shearing components, as shown in FIG. 21 and FIG. 22, a highly accurate measurement is possible because the dummy resistor 17 is not easily influenced by multi-axis strain components. When the strain sensor 3, such as shown in FIG. 19, FIG. 20, FIG. 21 and FIG. 22, is used, the strain measuring direction is <100>. That is, the strain sensor 3 can measure mainly the strains in the longitudinal direction of the diffusion layer that forms the strain sensor 3 and also those in a direction perpendicular to the longitudinal direction. Therefore, the mark 15 representing the strain measuring direction is formed either toward the <100> direction, i.e., longitudinal direction of the diffusion layer, or the direction perpendicular to it, or toward both directions. When circuits and wires are formed in directions perpendicular to and parallel to the <110> directions as in ordinary semiconductor devices, the strain measuring direction is hardly identifiable by the user. So, the mark 15 is preferably formed as shown in FIG. 23, for example.

As described above, when the strain sensor 3 and the dummy resistor 17 are formed using n-type impurity diffusion layers, there is an advantage that the manufacturing process becomes simple when other circuits are also formed of n-type semiconductor devices although the sensitivity slightly lowers as compared with a case where a p-type impurity diffusion layer is used. This is because the use of n-type semiconductor devices also in other circuits obviates the need for diffusing p-type impurities in order to form only the strain sensor 3. Further, the silicon crystal has a cleavage surface in <111> direction, and therefore setting the strain measuring direction in <100> offers the advantage that the silicon crystal does not easily crack when measuring large strains.

Figure 24:
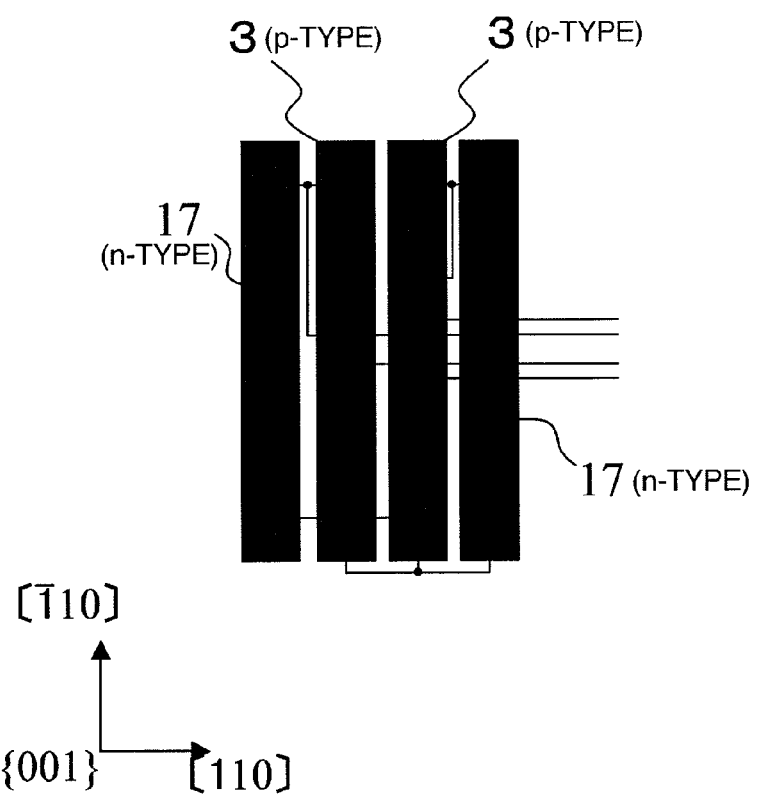
FIG. 24 illustrates another example of arrangement of the diffusion layers and interconnects connecting the diffusion layers in the mechanical quantity measuring apparatus as the second embodiment of the invention.
Figure 25:
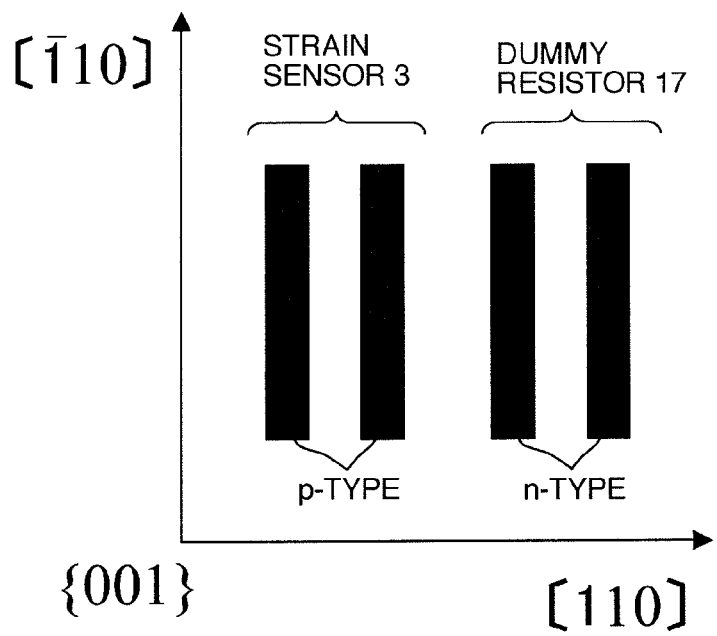
FIG. 25 illustrates a relation among a strain measuring direction, a crystal orientation of the silicon substrate, and a longitudinal direction of the diffusion layer in the mechanical quantity measuring apparatus as the second embodiment of the invention.

FIG. 24 shows an example arrangement when the strain sensor 3 is formed of a p-type impurity diffusion layer and the dummy resistor 17 is formed of an n-type impurity diffusion layer. FIG. 25 shows a relation between the shapes of the strain sensor 3 and dummy resistor 17 and the crystal orientation of the silicon substrate 2. In this case, both of the strain sensor 3 and the dummy resistor 17 are formed so that their longitudinal direction lies in <110> direction and the strain measuring direction is also <110>. In this example, the p-type impurity diffusion layer that forms the strain sensor 3 exhibits a resistance change of positive sign for a strain change of positive sign in the strain measuring direction. The n-type impurity diffusion layer that forms the dummy resistor 17, on the other hand, exhibits a resistance change of negative sign for a strain change of positive sign in the strain measuring direction. This offers an advantage that, compared with a bridge circuit having a low-sensitivity dummy resistor, a high output is produced, increasing the sensitivity. Further, since the strain sensor 3 and the dummy resistor 17 are formed parallel, this arrangement has another advantage of being able to reduce an area occupied by the Wheatstone bridge 16. This in turn reduces an overall chip size and therefore the cost.

Figure 26:
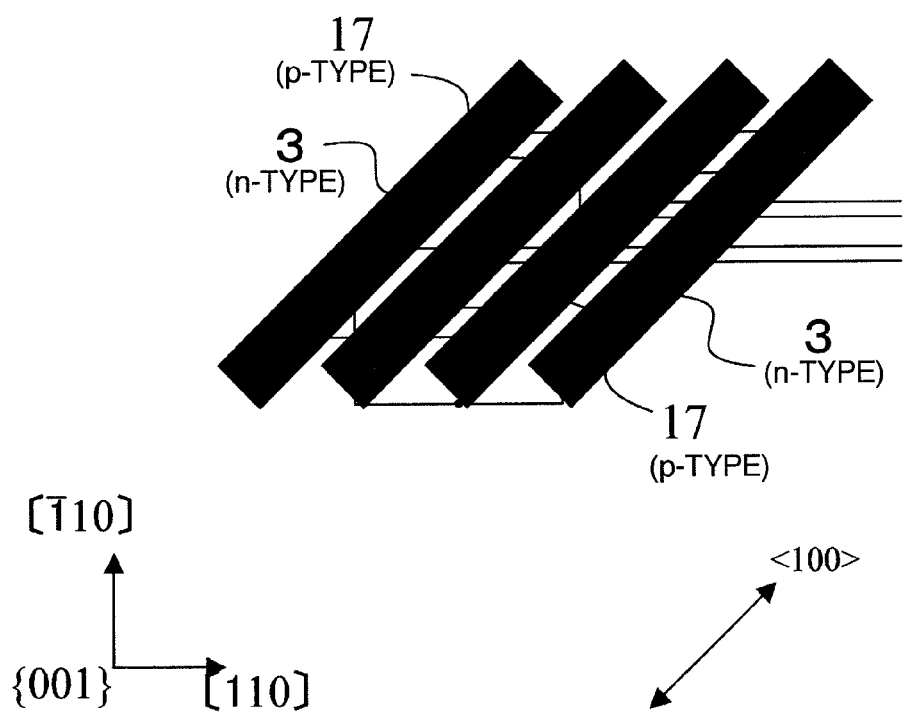
FIG. 26 illustrates another example of arrangement of the diffusion layers and interconnects connecting the diffusion layers in the mechanical quantity measuring apparatus as the second embodiment of the invention.
Figure 27:
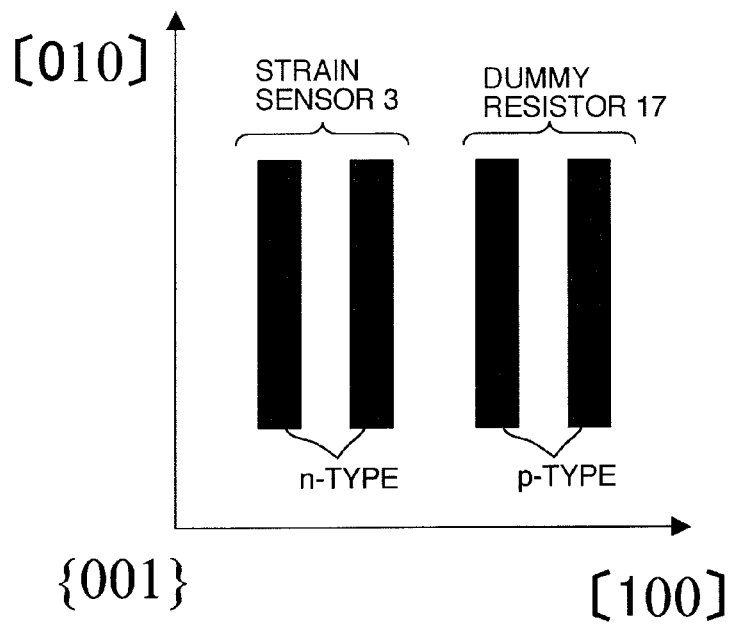
FIG. 27 illustrates a relation among a strain measuring direction, a crystal orientation of the silicon substrate, and a longitudinal direction of the diffusion layer in the mechanical quantity measuring apparatus as the second embodiment of the invention.

Further, FIG. 26 shows an example arrangement in which the strain sensor 3 is formed of an n-type impurity diffusion layer and the dummy resistor 17 is formed of a p-type impurity diffusion layer. FIG. 27 shows a relation between the shapes of the strain sensor 3 and the dummy resistor 17 and the crystal orientation of the silicon substrate 2. In this case, the strain sensor 3 and the dummy resistor 17 are formed almost parallel, with their longitudinal direction lying in <100>. The strain measuring direction is also <100>. In this example, the strain sensor 3 formed of an n-type impurity diffusion layer is arranged in a direction that maximizes the sensitivity for vertical strain. On the other hand, the dummy resistor 3 formed of a p-type impurity diffusion layer has the lowest sensitivity in all directions among the n- and p-type impurity diffusion layers that can be formed in a (001) plane. This arrangement therefore allows for a precise measurement. Further, since the strain sensor 3 and the dummy resistor 17 are formed parallel, the area occupied by the Wheatstone bridge 16 can be reduced.

Figure 28:
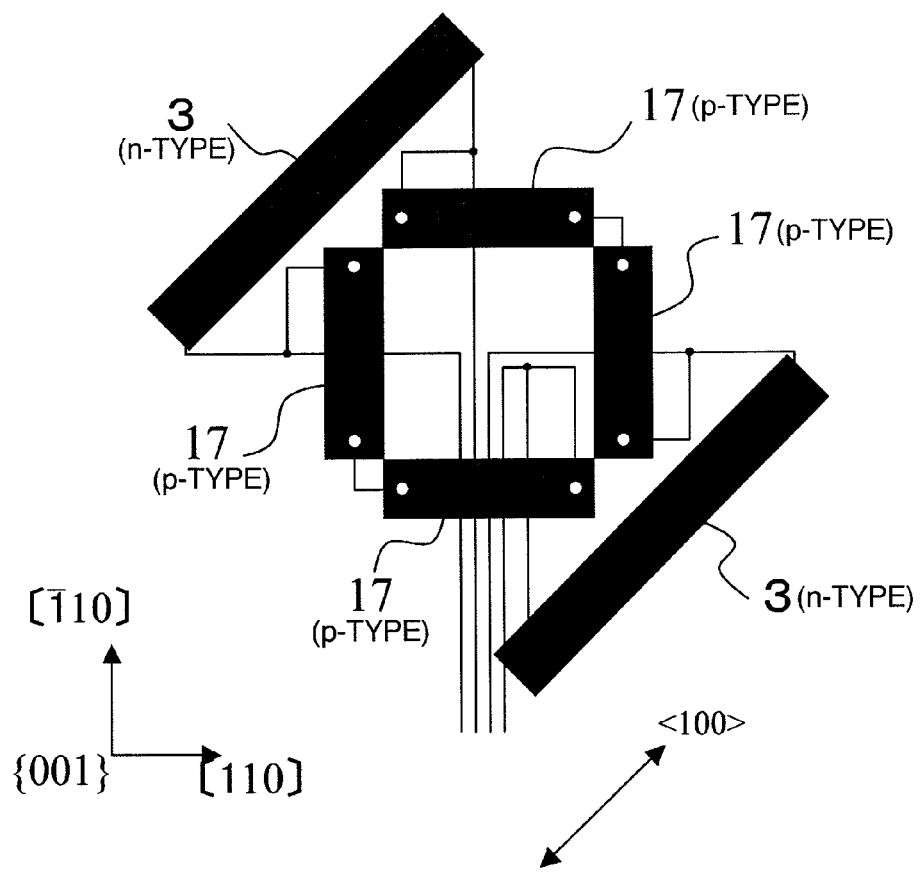
FIG. 28 illustrates another example of arrangement of the diffusion layers and interconnects connecting the diffusion layers in the mechanical quantity measuring apparatus as the second embodiment of the invention.
Figure 29:
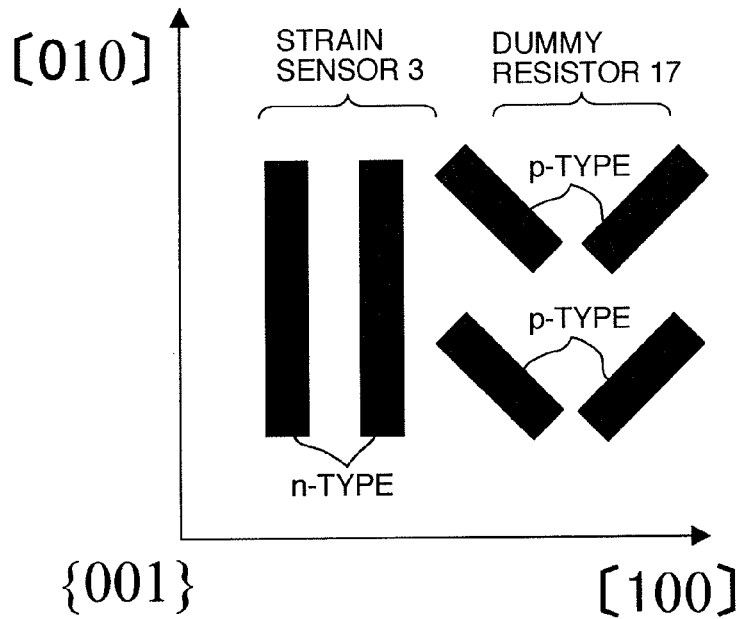
FIG. 29 illustrates a relation among a strain measuring direction, a crystal orientation of the silicon substrate, and a longitudinal direction of the diffusion layer in the mechanical quantity measuring apparatus as the second embodiment of the invention.

FIG. 28 shows an example arrangement in which the strain sensor 3 is formed of an n-type impurity diffusion layer and the dummy resistor 17 is formed of a p-type impurity diffusion layer. FIG. 29 shows a relation between the shapes of the strain sensor 3 and the dummy resistor 17 and the crystal orientation of the silicon substrate 2. In this case, the strain sensor 3 is formed so that its longitudinal direction lies in <100> and the dummy resistor 17 is formed so that its longitudinal direction lies in <110>. In this arrangement, the direction in which the maximum sensitivity is obtained is also <100>. Since the sensitivity of the strain sensor 3 in the <100> direction is high and the sensitivity of the dummy resistor 17 for various strain components is low, a highly precise measurement can be made.

Figure 34:
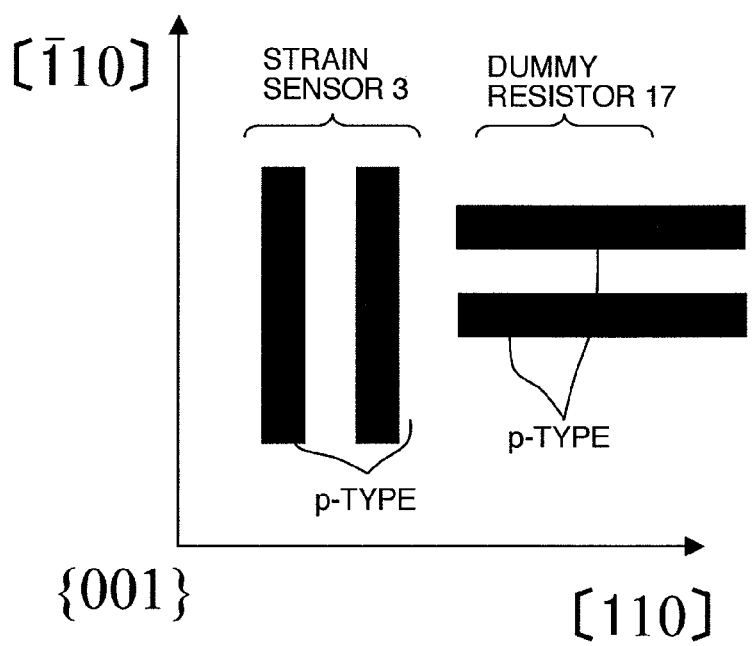
FIG. 34 illustrates a relation among a strain measuring direction, a crystal orientation of the silicon substrate, and a longitudinal direction of the diffusion layer in the mechanical quantity measuring apparatus as the second embodiment of the invention.

Further, it is possible to form the strain sensor and the dummy resistor so that their diffusion layers extend almost perpendicularly to each other, as shown in FIG. 34. In this case, the strain sensor 3 and the dummy resistor 17 have equivalent sensitivities but they are called the strain sensor 3 and the dummy resistor 17 for a convenience sake. This embodiment has as high a strain sensitivity in a direction perpendicular to the longitudinal direction of the strain sensor 3 as in the longitudinal direction. There is an advantage that the strain sensitivities are twice those of FIG. 18 and FIG. 19. This arrangement, however, has a drawback that resistance variations and sensitivity variations of the strain sensor 3 and the dummy resistor 17 are greatly reflected on the measurement, increasing measurement variations. Another disadvantage is that the occupied area is larger than those shown in FIG. 18 and FIG. 19. Although FIG. 34 shows an example case in which a p-type impurity diffusion layer is used, an n-type impurity diffusion layer may also be used. In that case, the impurity diffusion layers need to be formed so that their longitudinal directions lie in <110>. It is also possible to combine the n-type impurity diffusion layer and the p-type impurity diffusion layer.

Next, a Wheatstone bridge circuit that can take measurements of only a shearing strain will be explained.

Figure 30:
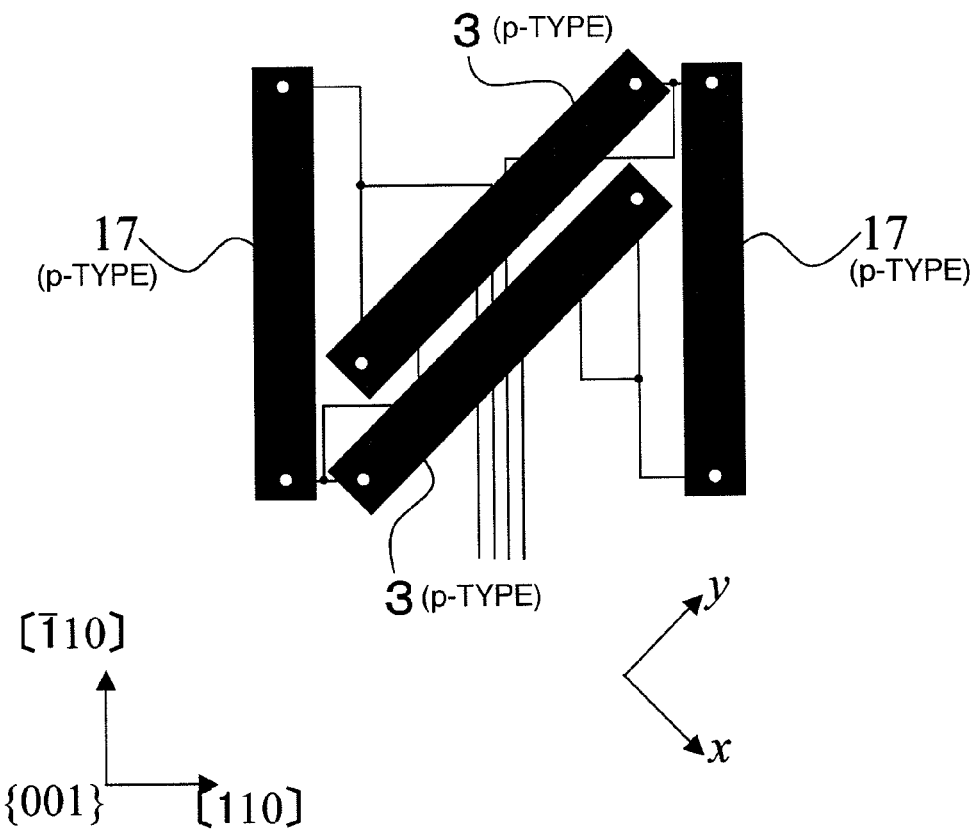
FIG. 30 illustrates another example of arrangement of the diffusion layers and interconnects connecting the diffusion layers in the mechanical quantity measuring apparatus as the second embodiment of the invention.
Figure 31:
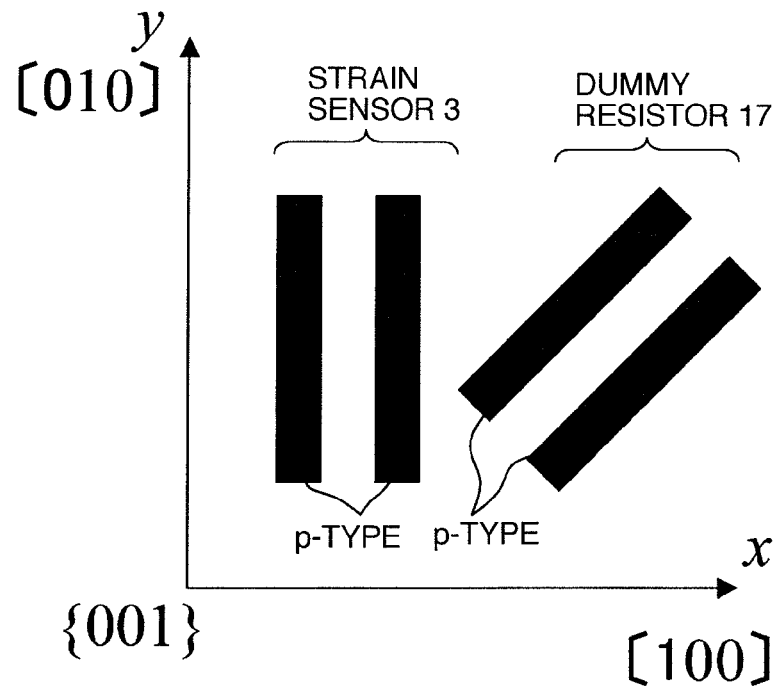
FIG. 31 illustrates a relation among a strain measuring direction, a crystal orientation of the silicon substrate, and a longitudinal direction of the diffusion layer in the mechanical quantity measuring apparatus as the second embodiment of the invention.

FIG. 30 shows an example arrangement in which the strain sensor 3 and the dummy resistor 17 are formed of a p-type impurity diffusion layer. FIG. 31 shows a relation between the shapes of the strain sensor 3 and dummy resistor 17 and the crystal orientation of the silicon substrate 2. In this case, the strain sensor 3 is formed so that its longitudinal direction lies in <100> and the dummy resistor 17 is formed so that its longitudinal direction lies in <110>. In an x-y coordinate system, such as shown in FIG. 30, this arrangement allows a shearing strain $\tau_{xy}$ to be measured.

Figure 32:
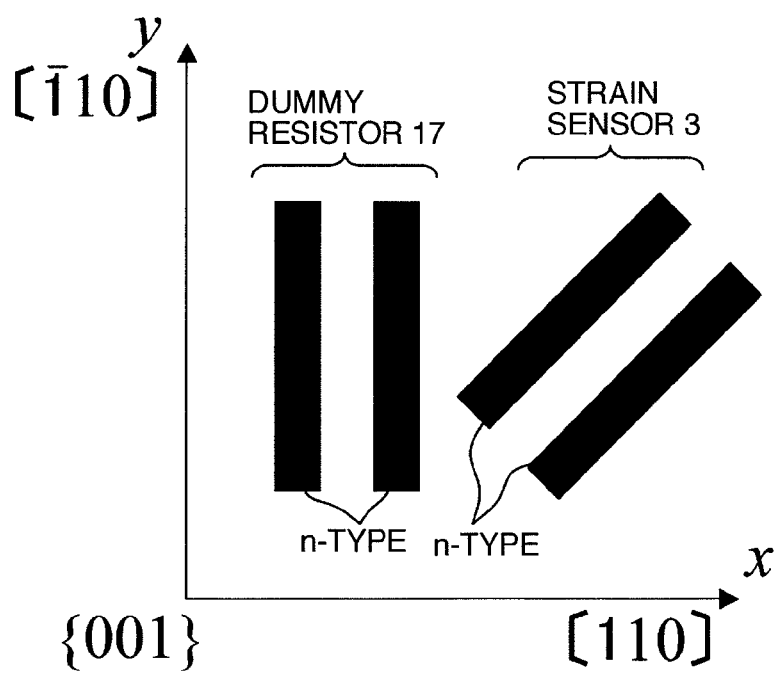
FIG. 32 illustrates a relation among a strain measuring direction, a crystal orientation of the silicon substrate, and a longitudinal direction of the diffusion layer in the mechanical quantity measuring apparatus as the second embodiment of the invention.
Figure 33:
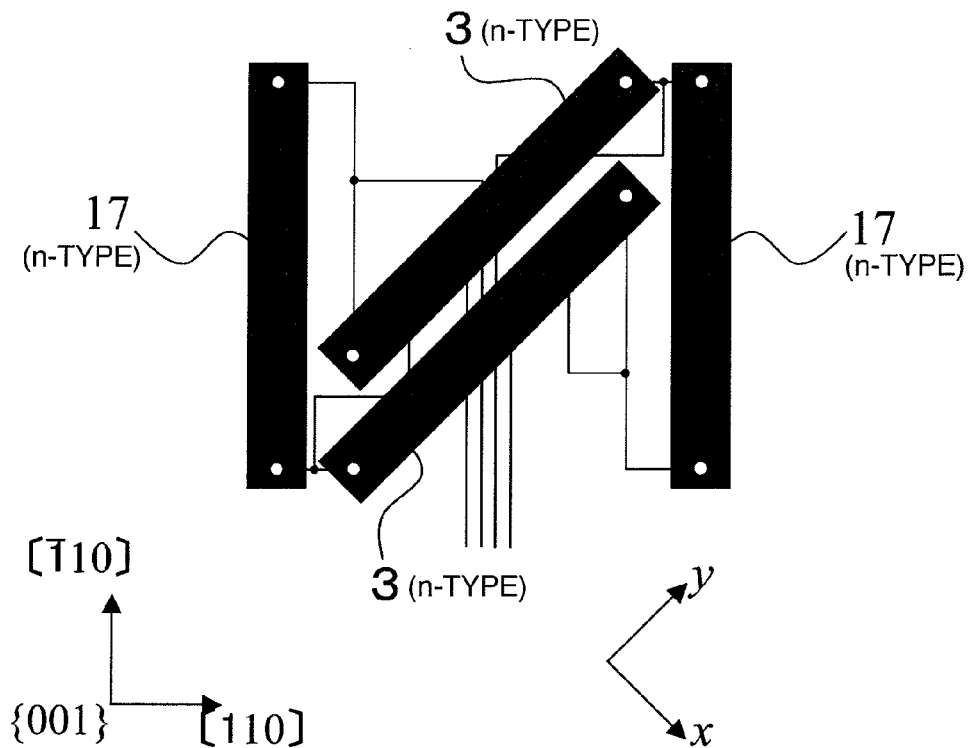
FIG. 33 illustrates another example of arrangement of the diffusion layers and interconnects connecting the diffusion layers in the mechanical quantity measuring apparatus as the second embodiment of the invention.

Further, FIG. 32 shows an example arrangement in which the strain sensor 3 and the dummy resistor 17 are formed of an n-type impurity diffusion layer. FIG. 33 shows a relation between the shapes of the strain sensor 3 and dummy resistor 17 and the crystal orientation of the silicon substrate 2. In this case, the strain sensor 3 is formed so that its longitudinal direction lies in <100> and the dummy resistor 17 is formed so that its longitudinal direction lies in <110>. In an x-y coordinate system, such as shown in FIG. 33, this arrangement allows a shearing strain $T_{xy}$ to be measured. That is, this arrangement has an advantage that the sensitivity is small for vertical strain components and high for only $T_{xy}$. By bonding this apparatus to a rotating shaft, a shaft torque can be measured.

Figure 35:
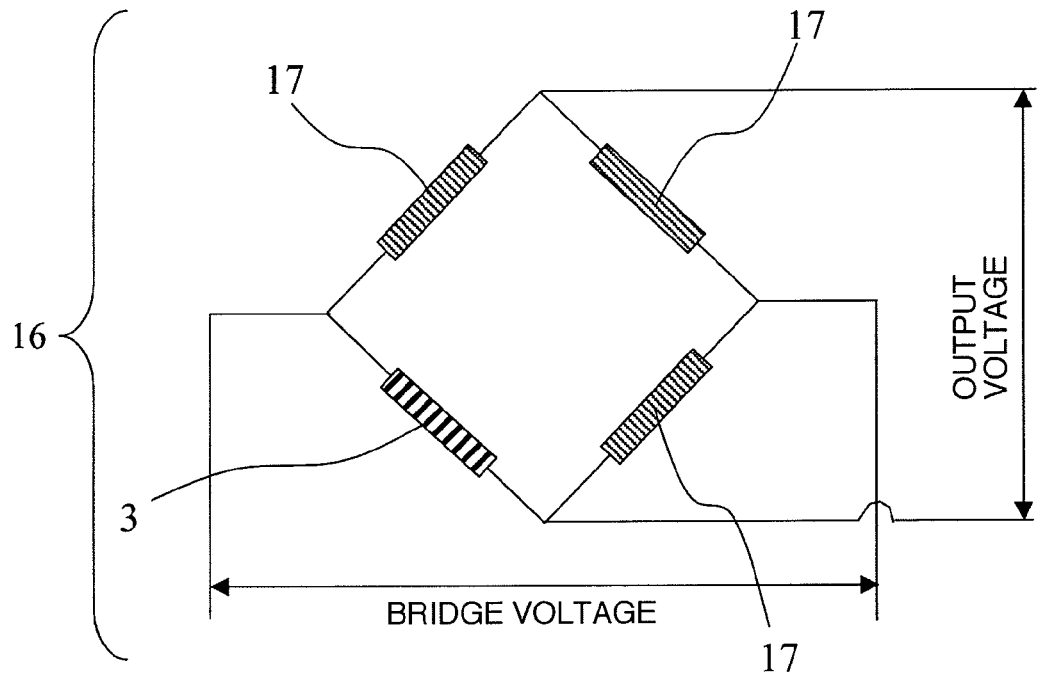
FIG. 35 illustrates a Wheatstone bridge in the mechanical quantity measuring apparatus as the second embodiment of the invention.
Figure 36:
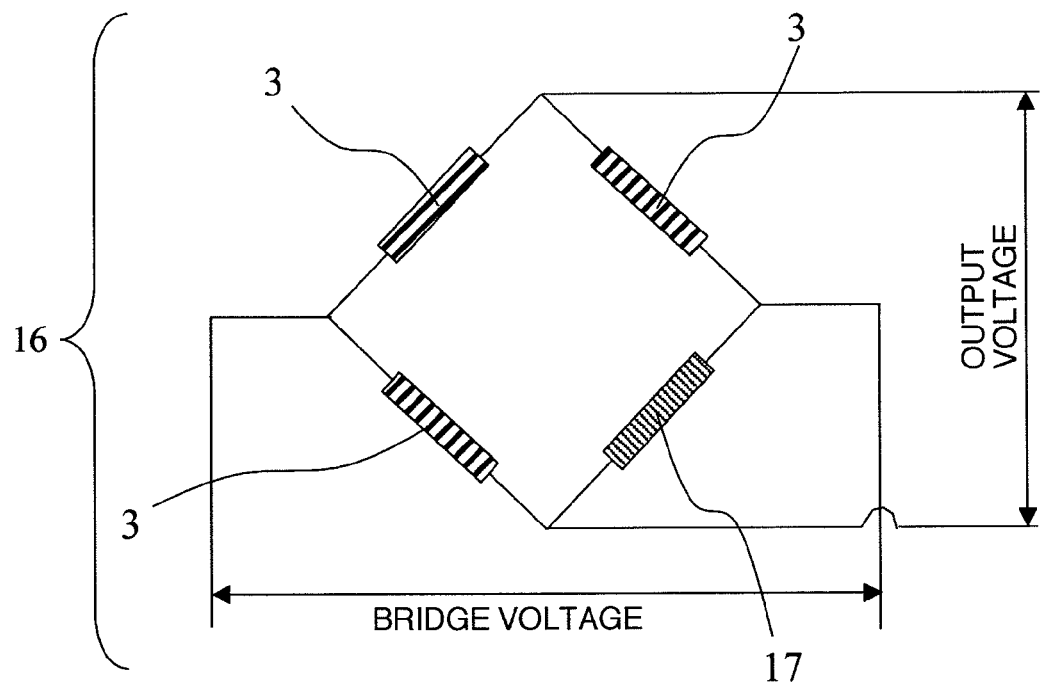
FIG. 36 illustrates a Wheatstone bridge in the mechanical quantity measuring apparatus as the second embodiment of the invention.

FIG. 35 shows how another Wheatstone bridge circuit of this embodiment is constructed. In this embodiment, the circuit comprises one strain sensor 3 and three dummy resistors 17. Although the strain sensitivity in this case degrades to half that of the circuit shown in FIG. 11, this circuit can produce the similar effects to that of FIG. 11. FIG. 36 shows a circuit made up of three strain sensors 3 and one dummy resistor 17. In this case, too, the circuit can produce the similar effects to that of FIG. 11 although the strain sensitivity falls to half that of the circuit shown in FIG. 11. The relation between the shapes of the strain sensor 3 and dummy resistor 17 and the crystal orientation of the silicon substrate 2 can apply the combinations shown in FIG. 12 through FIG. 34. As to the arrangement of the strain sensor 3 and the dummy resistor 17, it is desirable to arrange the strain sensor and the dummy resistor as close to each other as possible, considering the problem of temperature uniformity.

The sensor may be used as a single device.

Figure 37:
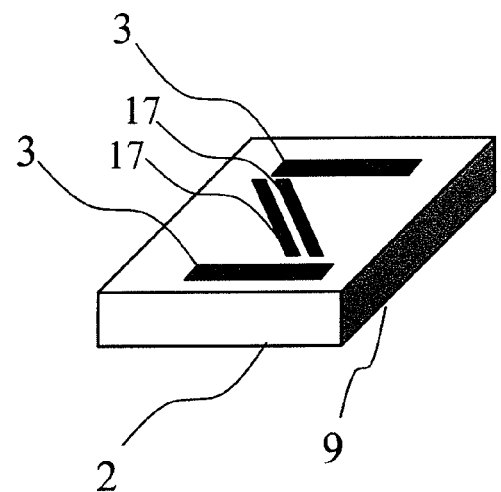
FIG. 37 is a perspective view showing one chip formed with only a strain measuring unit in the mechanical quantity measuring apparatus as the second embodiment of the invention.

The embodiment having the Wheatstone bridge shown in FIG. 12 to FIG. 36 formed on the silicon substrate 2 can be used as a single strain sensor, as shown in FIG. 37. The strain sensor having the Wheatstone bridge 16 of this embodiment formed on the same silicon substrate 2 obviates the need for installing the Wheatstone bridge outside the silicon substrate 2 as is done in the common measurement using the ordinary strain gauge. Further, since the Wheatstone bridge is connected to other circuits through the silicon substrate, its heat conduction is good allowing for easy temperature compensation. Further, since it is fabricated by a semiconductor manufacturing process, the sensor unit can be formed small, which in turn enables the measurement of strain in small parts. Since the silicon substrate 2 and the dummy resistor 17, that together make up the Wheatstone bridge, are concentratedly formed in a very small area on one silicon substrate, the noise resistance of the circuit is excellent.

Figure 38:
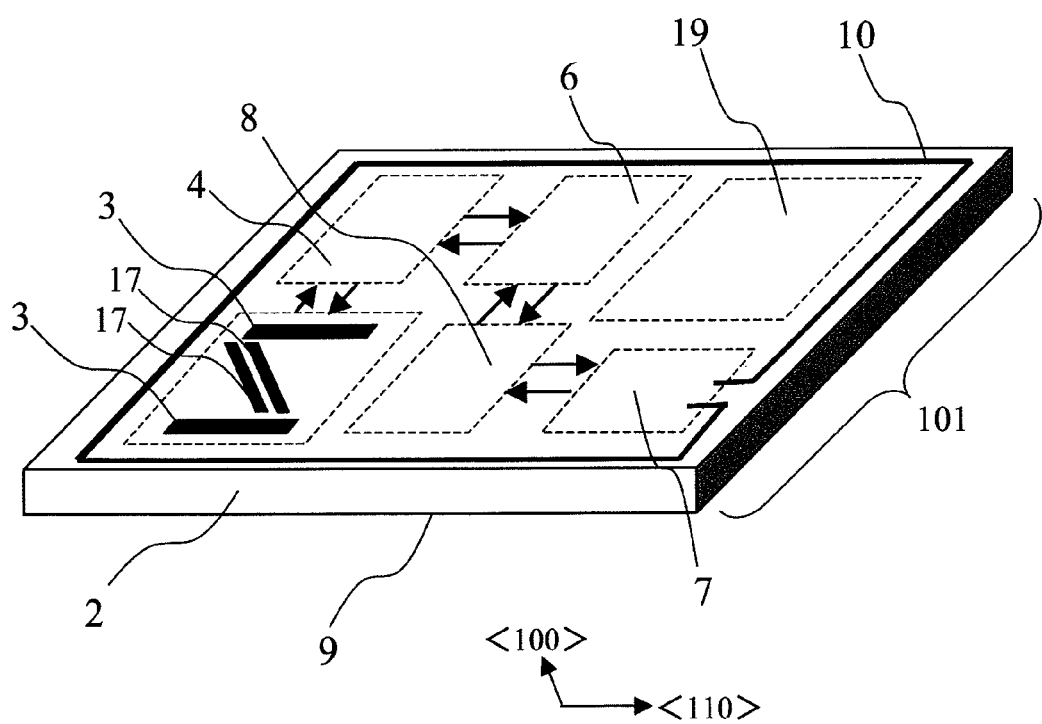
FIG. 38 is a perspective view showing the mechanical quantity measuring apparatus as the second embodiment of the invention having a self power generating unit.
Figure 39:
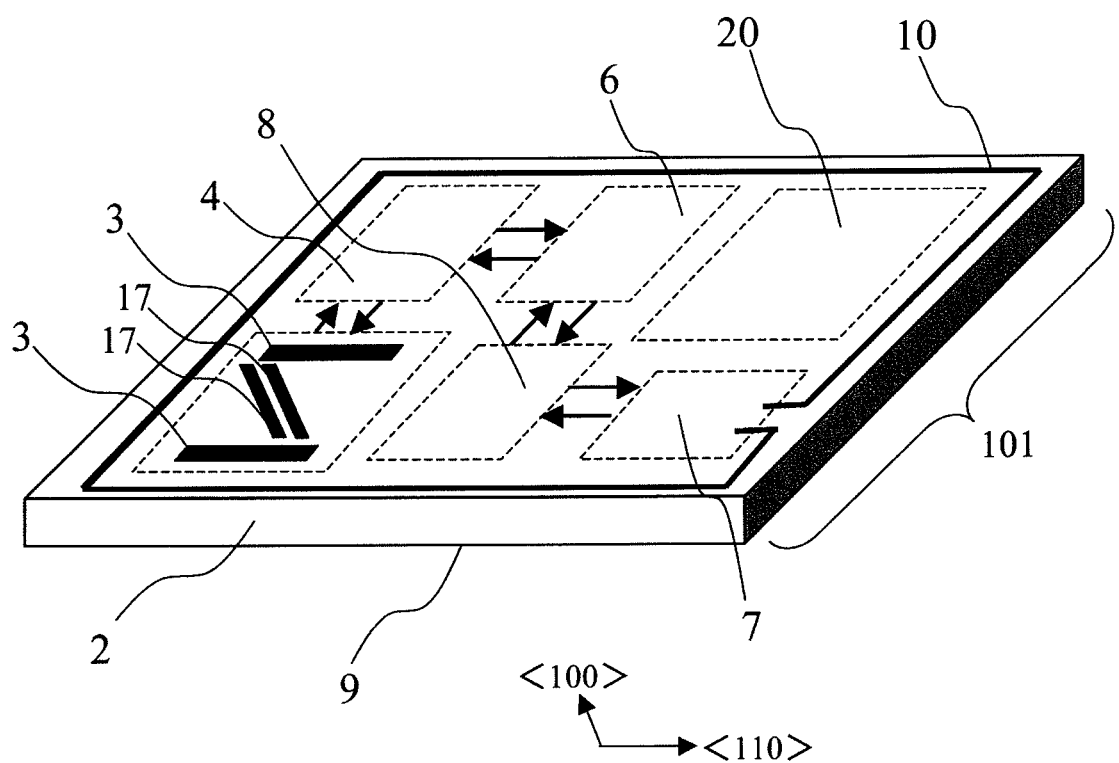
FIG. 39 is a perspective view showing the mechanical quantity measuring apparatus as the second embodiment of the invention having a battery.

The above Wheatstone bridge can also be applied similarly to a chip having a self power generating unit 19, as shown in FIG. 38. In this case, too, since the circuit of this invention operates on a small power and is little affected by external disturbances (noise), it can also be applied to apparatus that can self-generate only a small power. For example, when the self power generating unit 19 transforms vibrations into energy, the apparatus can measure strains even where vibrations are small. Further, in an apparatus having a solar cell mounted as the self power generating unit 19, strain measurements can be made at locations where illumination level is low. Further, in a chip that is supplied electricity from a battery 20 as shown in FIG. 39, since this invention can prolong the life of the battery 20, the measurement of mechanical quantities can be made for a long period of time. Although FIG. 39 shows the construction in which the battery 20 is built into the chip, the battery 20 may be installed outside the chip. In that case, a battery 20 of larger capacity can be installed allowing for a longer period of use.

Figure 40:
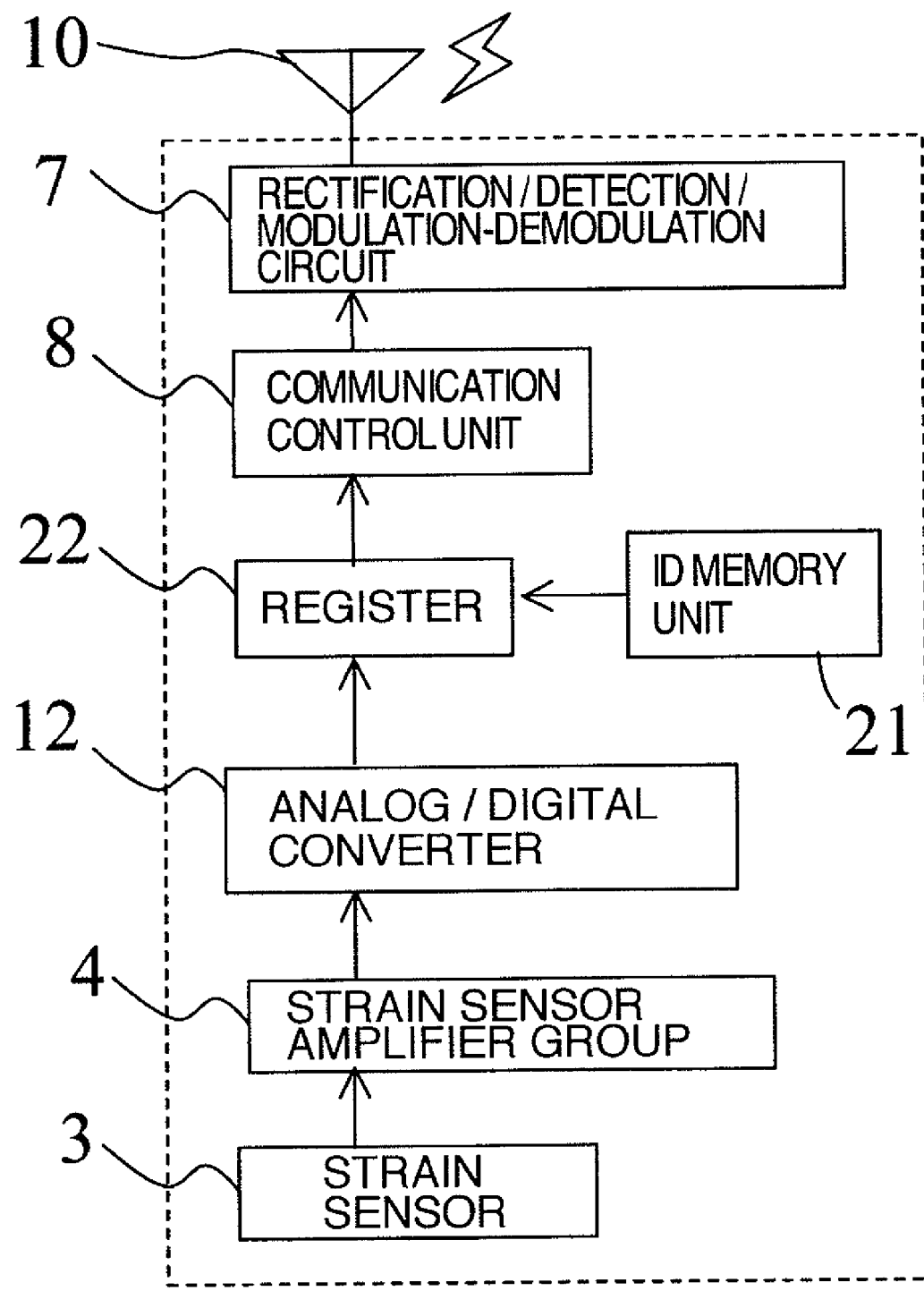
FIG. 40 is a schematic diagram showing a mechanical quantity measuring apparatus as a third embodiment of the invention having an ID memory unit and capable of transmitting an ID value together with a measured strain value.

A third embodiment of this invention will be explained by referring to FIG. 40 to FIG. 42. FIG. 40 shows a mechanical quantity measuring apparatus of this embodiment. This apparatus has the similar construction to those of the first and second embodiment and can also transmit an ID number. This apparatus is characterized by an ID memory unit 21 storing an ID number. A radio wave transmitted from a reader/writer is received and smoothed by this apparatus which then uses the smoothed electricity as a power source to operate the strain sensor 3 and the strain sensor amplifier group 3. A resistance change that is read and amplified is converted by an analog/digital converter 12 into a digital value, which is then temporarily stored in a register 22 together with the ID number supplied from the ID memory unit 21, and then transmitted through a communication control unit 8 and a rectification/detection/modulation-demodulation circuit 7. With this embodiment, since the reader/writer can receive the ID number together with the measured strain value, the management of measurements can be facilitated. For example, since strains at various locations can be managed based on the ID numbers, it is possible to check changes of strain over time at any particular location with ease.

Figure 41:
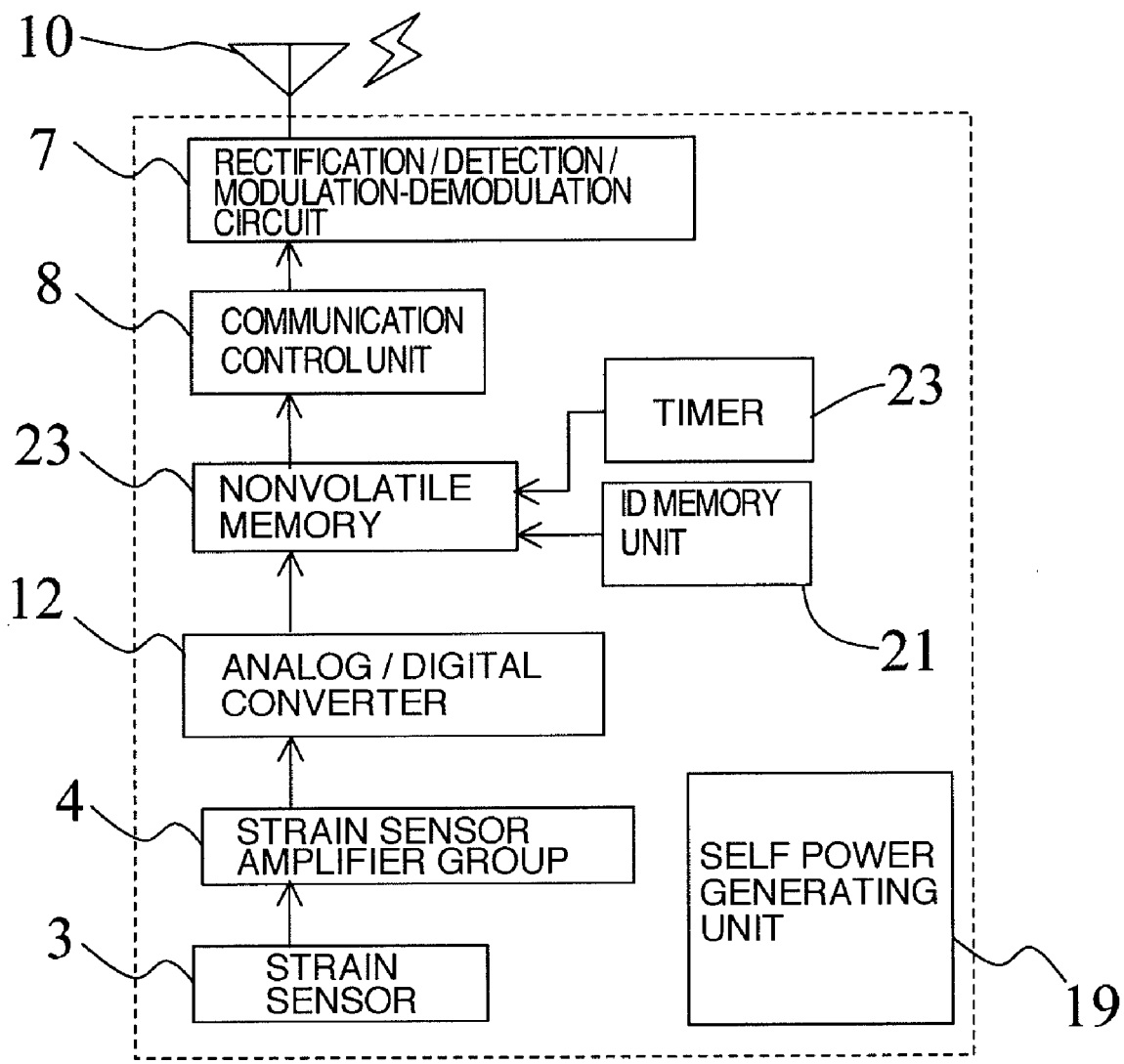
FIG. 41 is a schematic diagram showing the mechanical quantity measuring apparatus as the third embodiment of the invention having a self power generating unit.

FIG. 41 shows a configuration of another mechanical quantity measuring apparatus, which has a self power generating unit allowing for a measurement of a mechanical quantity even when the apparatus is not receiving a radio wave from the reader/writer. It also incorporates a nonvolatile memory 23 that can store the strain value permanently. If the nonvolatile memory 23 is made to store strain values larger than a preset value, a history of only large loads can be kept. This can reduce the required memory capacity and therefore enables the apparatus to be operated with a small generated power. A timer 24 is built into the apparatus. This offers an advantage of being able to store time, load and ID number at the same time. The measured values accumulated in the nonvolatile memory 23 can be read out through electromagnetic induction or microwaves. That is, since transmitting the measured values through radio waves requires a large electric power, the energy for radio wave transmission is supplied by the electromagnetic induction or microwaves. The energy for the measurement that does not require a large amount of electricity is supplied by the self generated power. With this invention, it is possible to reduce power consumption of the strain sensor 3 and thus realize a mechanical quantity measuring apparatus shown in FIG. 41. That is, since the transmission of radio wave is powered by the electromagnetic induction or microwaves and the power consumption of the sensor is reduced, the measurement can be made at all times even when the power produced by the self power generating unit 19 is small. Here, the self power generating unit 19 includes a battery and performs a vibration power generation, a solar power generation, a power generation using piezoelectric elements, and a power generation using fluid force. As described above, this embodiment has a great advantage that the apparatus can be operated even in applications where an output of the self power generating unit 19 is small.

Figure 42:
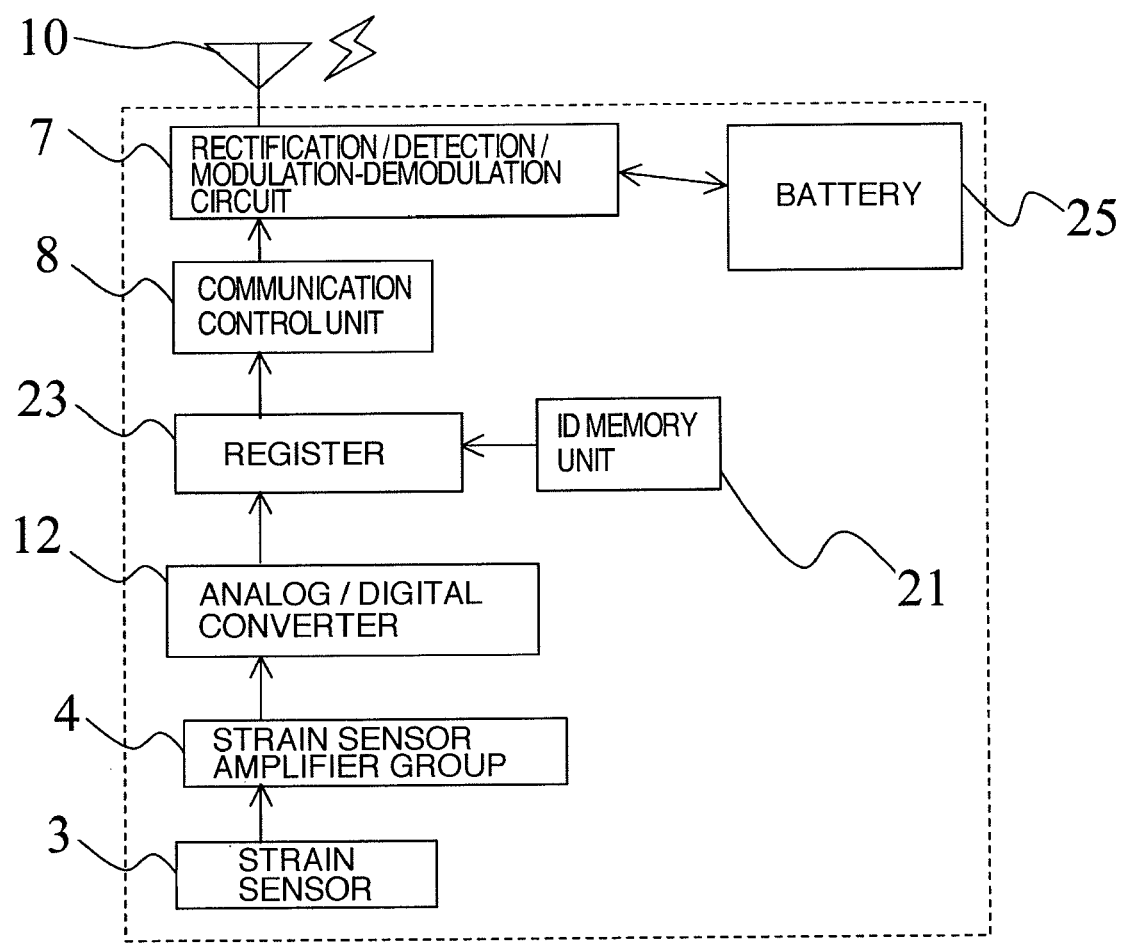
FIG. 42 is a schematic diagram showing the mechanical quantity measuring apparatus as the third embodiment of the invention charging a battery with a part of an energy of electromagnetic induction or microwaves and measuring a strain by using an electricity stored in the battery.

FIG. 42 shows an example configuration of a measuring apparatus which is powered by electromagnetic induction or microwaves and which introduces a part of the received power to a battery 25 for charging. Since this invention can reduce the power required for sensing to a very small level, strain can be measured at all times or intermittently by using power from the battery 25. Transmitting a measured value over a radio wave requires a sufficient power, so the apparatus is supplied electricity through radio wave when reading the measured value, as in the first embodiment. At the same time, the battery 25 is also charged. With this invention, since the power consumption of the strain sensor 3 can be reduced, the amount of electricity required to be charged also decreases, making it possible to realize the mechanical quantity measuring apparatus shown in FIG. 42.

While the invention has been described by taking up example embodiments, it is apparent to those skilled in the art that this invention is not limited to these embodiments and that various modifications and changes may be made without departing from the spirit of this invention and within the scope of appended claims.

What is claimed is:

1. A mechanical quantity measuring apparatus having formed in a (100) surface of single crystal silicon substrate a Wheatstone bridge circuit having four sides made of two strain sensor formed on the opposite two sides and two dummy resistors formed on the other opposite sides;
   wherein each strain sensor is formed of an n-type impurity diffusion layer and each dummy resistor is formed of a p-type impurity diffusion layer;
   wherein both of the strain sensor and the dummy resistor have their longitudinal directions set in a <100> direction.

2. The mechanical quantity measuring apparatus according to claim 1 further comprising:
   a conversion circuit to amplify a signal from the Wheatstone bridge circuit and convert it into a digital signal;
   a transmission circuit to transmit the digital signal to the outside of the semiconductor substrate; and
   a power supply circuit to supply as electricity an electromagnetic wave energy received from the outside of the semiconductor substrate to any of the circuits.

3. The mechanical quantity measuring apparatus according to claim 1 further comprising:
   a conversion circuit to amplify a signal from the Wheatstone bridge circuit and convert it into a digital signal;
   a transmission circuit to transmit the digital signal to the outside of the silicon substrate;
   a power supply circuit to supply electricity to these circuits based on at least one of vibrations, sunlight and temperature differences received from the outside of the silicon substrate; and
   a connector to electrically connect a power supply ground of any of the circuits on the single crystal silicon substrate to an object to be measured.

4. The mechanical quantity measuring apparatus according to claim 1, wherein the single crystal silicon substrate is 100 μm or less thick.

5. The mechanical quantity measuring apparatus according to claim 1, wherein a back of the main surface of the single crystal silicon substrate is formed with a bonding surface for bonding to the object to be measured.

6. The mechanical quantity measuring apparatus according to claim 1, further comprising a visible mark formed in a strain measuring direction on the surface of a single crystal silicon substrate.

7. The mechanical quantity measuring apparatus according to claim 1, further comprising:
   a conversion circuit to amplify a signal from the Wheatstone bridge circuit and convert it into a digital value;
   a transmission circuit to transmit the digital value and an ID number stored in a ROM to the outside of the silicon substrate;
   a power supply circuit to supply as electricity an electromagnetic wave energy received from the outside of the silicon substrate to any of the circuits.

8. The mechanical quantity measuring apparatus according to claim 1 further comprising:
   a conversion circuit to amplify a signal from the Wheatstone bridge circuit and convert it into a digital signal;
   a transmission circuit to transmit the digital signal to the outside of the silicon substrate; and
   any of a vibration power generation unit, a solar power generation unit and a temperature difference power generation unit provided outside the single crystal silicon substrate to electrically connect to any of the circuits.

* * * * *